(12) United States Patent
Awadin et al.

(10) Patent No.: US 12,519,532 B2
(45) Date of Patent: Jan. 6, 2026

(54) BEAM FAILURE RECOVERY FOR MBS UEs

(71) Applicant: Samsung Electronics Co., Ltd., Suwon-si (KR)

(72) Inventors: Mohamed Awadin, Plymouth Meeting, PA (US); Jung Hyun Bae, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 526 days.

(21) Appl. No.: 17/667,529

(22) Filed: Feb. 8, 2022

(65) Prior Publication Data

US 2022/0330060 A1   Oct. 13, 2022

Related U.S. Application Data

(60) Provisional application No. 63/168,248, filed on Mar. 30, 2021.

(51) Int. Cl.
*H04B 7/06* (2006.01)
*H04L 5/00* (2006.01)
(Continued)

(52) U.S. Cl.
CPC ....... *H04B 7/06964* (2023.05); *H04L 5/0048* (2013.01); *H04W 24/08* (2013.01); *H04W 24/04* (2013.01)

(58) Field of Classification Search
CPC ....... H04W 24/08; H04W 24/04; H04W 4/06; H04W 72/1273; H04W 72/21;
(Continued)

(56) References Cited

U.S. PATENT DOCUMENTS

2008/0037472 A1   2/2008  Ryu et al.
2009/0154386 A1   6/2009  So et al.
(Continued)

OTHER PUBLICATIONS

European Partial Search Report for Application No. 22164414.9, mailed Aug. 12, 2022.
(Continued)

*Primary Examiner* — Oussama Roudani
(74) *Attorney, Agent, or Firm* — Renaissance IP Law Group LLP

(57) ABSTRACT

A system and a method are disclosed to manage beams in a Multicast and Broadcast Services (MBS) wireless communication network. A first device receives a Physical Downlink Control Channel (PDCCH) and a Physical Downlink Shared Channel (PDSCH) for MBS communications in a Common Frequency Resource (CFR). The first device also receives a configuration sent by the second device that is for a MBS Beam Failure Detection Reference Signal (BFD-RS). The first device may then detect a MBS Beam Failure Incident (BFI) of a first MBS beam using the MBS BFD-RS configuration. In response to detecting the BFI, the first device may autonomously connect to a second MBS beam. Alternatively, the first device may communicate the BFI to the second device in order to recover a MBS beam. In one embodiment, the first device is a User Equipment (UE), and the second device is a Next Generation NodeB (gNB).

20 Claims, 10 Drawing Sheets

(51) Int. Cl.
*H04W 24/04* (2009.01)
*H04W 24/08* (2009.01)

(58) Field of Classification Search
CPC .. H04W 72/231; H04W 76/19; H04B 7/0695; H04B 7/088; H04B 7/06964; H04L 5/0048; H04L 5/0053
See application file for complete search history.

(56) References Cited

U.S. PATENT DOCUMENTS

| | | |
|---|---|---|
| 2011/0058511 A1 | 3/2011 | Kim et al. |
| 2011/0064016 A1 | 3/2011 | Kim et al. |
| 2015/0131515 A1 | 5/2015 | Lavi et al. |
| 2019/0349059 A1* | 11/2019 | John Wilson ......... H04L 5/0091 |
| 2020/0350972 A1* | 11/2020 | Yi ....................... H04L 5/0051 |
| 2020/0383167 A1 | 12/2020 | Sengupta et al. |
| 2020/0389884 A1 | 12/2020 | Hakola et al. |
| 2021/0409091 A1* | 12/2021 | Svedman ............... H04L 5/0051 |
| 2022/0095137 A1* | 3/2022 | Sakhnini ............... H04W 24/08 |
| 2022/0173785 A1* | 6/2022 | Venugopal ............ H04W 72/23 |
| 2022/0173788 A1* | 6/2022 | Kang .................... H04L 1/1864 |
| 2023/0163914 A1* | 5/2023 | Koskela ................ H04L 5/0023 370/242 |
| 2023/0204705 A1* | 6/2023 | Thomas ................ H04L 5/0048 342/450 |
| 2024/0155596 A1* | 5/2024 | Ganesan .............. H04B 7/0623 |

OTHER PUBLICATIONS

Qualcomm Incorporated, "Views on Reliability Enhancement for Multicast RRC_CONNECTED UEs", 3GPP TSG RAN WG1 #104, e-Meeting, R1-2101488, Jan. 25-Feb. 5, 2021, 7 pages.
European Extended Search Report for Application No. 22164414.9, mailed Dec. 22, 2022.

* cited by examiner

BEAM FAILURE RECOVERY FOR MBS UEs

CROSS-REFERENCE TO RELATED APPLICATION

This application claims the priority benefit under 35 U.S.C. § 119(e) of U.S. Provisional Application No. 63/168,248, filed on Mar. 30, 2021, the disclosure of which is incorporated herein by reference in its entirety.

TECHNICAL FIELD

The subject matter disclosed herein relates to wireless communications. More particularly, the subject matter disclosed here relates to systems and methods for recovering from a Multicast and Broadcast Services (MBS) beam failure incident.

BACKGROUND

In new radio (NR) Rel. 15, a beam failure recovery (BFR) procedure was introduced for recovering a beam failure in primary cell (PCell). In NR Rel. 16, the BFR procedure was further extended and applied in a secondary cell (SCell). FIG. 1 depicts the main operations of a NR Rel. 15 and a Rel 16 BFR procedure 100. At 101, for both a special cell (SpCell) and a SCell, the gNB may explicitly configure a set of beam failure detection-reference signal (BFD-RS) that may be used for the assessment of the serving beams quality, denoted by $\overline{q_0}$. If not configured, a User Equipment (UE) assumes the Reference Signal RS Quasi Co-Located (QCLed) with monitoring physical downlink control channel (PDCCH) belong to $\overline{q_0}$. The UE does not expect to be configured with more than two RS with radio resource control (RRC) parameter purpose that is set as beamFailure or both radio link monitoring (RLM) and beam failure. For a SCell, the purpose of the RRC parameter may be set as beamFailure only.

A UE conducts measurements of the RS s and if the qualities of the RS s fall below a particular threshold, the UE physical layer (PHY) reports a beam failure instance (BFI) to a higher medium access control (MAC) layer of the UE. The threshold used for assessment may correspond to a default value of the threshold used for RLM and the threshold may be based on hypothetical block error rate (BLER) (10% BLER).

A BFI reporting from UE physical layer to UE MAC layer may occur based on a particular periodicity. For a non-discontinuous reception (DRX) mode, the periodicity may be the maximum period (i.e., 2 msec, shortest periodicity of BFD-RSs).

To declare a beam failure, the UE MAC should receive at least beamFailureInstanceMaxCount BFI reports from UEs PHY within a time duration of beamFailureDetectionTimer. If the timer expires before the reported BFI reaches beamFailureInstanceMaxCount, a BFI counter is reset to 0. This is beneficial to realize a behavior in which the reported BFI is to be contiguous, though triggering a beam failure by non-contiguous BFI reports may also be supported by the specification. Note that the timer is in units of a BFI reporting period from the UE PHY layer to the UE MAC layer. For example, if beamFailureInstanceMaxCount is set to 3 and beamFailureDetectionTimer is set to 3 BFI reporting periods, then the BFI reports should be contiguous to trigger a Beam Failure Recovery Request (BFRQ). If beamFailureDetectionTimer is set to more than 3 BFI reporting periods, then 3 on-contiguous BFIs may trigger a BFRQ as well.

At 102, the gNB may configure a candidate RS that may be used to recover the failed beam, denoted by $\overline{q_1}$ in the specification. For a SpCell, indices of a candidate beam RSs may be associated with different preamble IDs and/or random access (RA) occasions that may be used later to transmit BFRQ. This association may be beneficial to let the gNB know which candidate beam is preferred by the UE. On the other hand, for a SCell, the indexes of the candidate beam RSs may be associated with SCell ID. This allows the UE indicate the preferred candidate beam from any other serving cell as well, as described below. To assess the quality of the candidate beam, the gNB may configure the UE with a RSRP threshold to determine whether this beam may be reported as a candidate beam or not.

At 103, in an operation for a BFRQ for a SpCell, a UE transmits the contention free-physical random access channel (CF-PRACH) associated with the preferred candidate beam if the quality of any of the measured candidate beams is higher than the provided RSRP threshold. Also, a contention based (CB) PRACH may be used as well in which a BFR medium access control-control element (MAC-CE) may be respectively included in Msg3 or MsgA of a 4-step RACH or a 2-step RACH procedure. For a SCell, a UE transmits BFR MAC-CE indicating the index of the failed cell and the index of the preferred candidate beam, if the quality of any of the measured candidate beams is greater than the provided RSRP threshold. If there are no PUSCH resources to carry MAC-CE, a UE may transmit a schedule request (SR) to request a resource. The configurations of this SR is provided through higher layer signaling parameter schedulingRequestID-BFR-SCell.

At 104, a UE beings monitoring for a response of the gNB to determine whether the procedure has been successful. For a SpCell when CF PRACH is used, a UE beings monitoring the PDCCH scrambled with a cell-radio network temporary identifier (C-RNTI) or MCS-C-RNTI in a configured search space (SS), through recoverySearchSpaceId, four slots after the slot contain a PRACH transmission. A UE assumes that the gNB transmits the PDCCH using the indicated candidate beam. If the UE receives the PDCCH within beamFailureRecoveryTimer window, then the recovery is successful and uses the identified candidate beam for the subsequent transmission. When the UE uses CB PRACH followed by BFR MAC-CE transmission for BFRQ, the UE monitors PDCCH scrambled with RA-RNTI. On the other hand, for a SCell, if the UE receives downlink control information (DCI) that schedules a PUSCH with the same HARQ process number used for BFR MAC-CE transmission and a new data indication (NDI) is toggled, the UE assumes a BFR on the SCell is successful and uses the new identified beam for the reception on the SCell.

For RRC-connected UEs, it has been agreed to have a Common Frequency Resource (CFR) used for MBS activities that is confined within the associated unicast BWP (bandwidth part). There are two alternatives to define a CFR; either to define it as a MBS BWP, or as a MBS region having contiguous Physical Resource Blocks (PRBs), as described the following agreement.

Agreement:
For multicast of RRC-CONNECTED UEs, a common frequency resource for group-common PDCCH/PDSCH is confined within the frequency resource of a dedicated unicast BWP to support simultaneous reception of unicast and multicast in the same slot
• Down select from the two options for the common frequency resource for group-common PDCCH/PDSCH
○ Option 2A: The common frequency resource is defined as an MBS specific BWP, which is associated with the dedicated unicast BWP and using the same numerology (SCS and CP)
■ FFS BWP switching is needed between the multicast reception in the MBS specific BWP and unicast reception in its associated dedicated BWP
○ Option 2B: The common frequency resource is defined as an 'MBS frequency region' with a number of contiguous PRBs, which is configured within the dedicated unicast BWP.
■ FFS: How to indicate the starting PRB and the length of PRBs of the MBS frequency region
• FFS whether UE can be configured with no unicast reception in the common frequency resource
• FFS on details of the group-common PDCCH/PDSCH configuration
• FFS whether to support more than one common frequency resources per UE/per dedicated unicast BWP subjected to UE capabilities
• FFS whether the use of a common frequency resource for multicast is optional or not
• FFS whether the common frequency resource is applicable for PTM scheme 2 (if supported) or not The basic functionalities provided by a CFR were also agreed upon, as described in the following agreement. Basically, the CFR is expected to provide the configurations of physical downlink shared channel (PDSCH), PDCCH, semi-persistent scheduling (SPS) PDSCH for MBS activities.

Agreement:
From RAN1 perspective, the CFR (common frequency resource) for multicast of RRC-CONNECTED UEs, which is confined within the frequency resource of a dedicated unicast BWP and using the same numerology (SCS and CP), includes the following configurations:
• Starting PRB and the number of PRBs
• One PDSCH-config for MBS (i.e., separate from the PDSCH-Config of the dedicated unicast BWP)
• One PDCCH-config for MBS (i.e., separate from the PDCCH-Config of the dedicated unicast BWP)
• SPS-config(s) for MBS (i.e., separate from the SPS-Config of the dedicated unicast BWP)
• FFS: Other configurations and details including whether signaling of starting PRB and the length of PRBs is needed when CFR is equal to the unicast BWP
• FFS: Whether a unified CFR design is also used for broadcast reception for RRC_IDLE/INACTIVE and RRC_CONNECTED
• FFS: Whether Coreset(s) for CFR in addition to existing Coresets in UE dedicated BWP is needed
• Note: The terminology of CFR is only aiming for RAN1 discussion, and the detailed signaling design is up to RAN2
• Note: This agreement does not negate any previous agreements made on CFR

SUMMARY

An example embodiment provides a method to manage beams in a wireless communication network in which the method may include: receiving, at a first device from a second device, a Physical Downlink Control Channel (PDCCH) and a Physical Downlink Shared Channel (PDSCH) for communications in a Common Frequency Resource (CFR); receiving, at the first device, a configuration for at least one Beam Failure Detection Reference Signal (BFD-RS); and detecting, at the first device, a Beam Failure Incident (BFI) of a first beam using the at least one BFD-RS configuration. In one embodiment, the first device may include a User Equipment (UE), and the second device may include a Next Generation NodeB (gNB). In another embodiment, the configuration for the at least one BFD-RS provides explicit information about the at least one BFD-RS configuration by using higher-layer signaling. In still another embodiment, the configuration for the at least one BFD-RS provides implicit information to the first device about the at least one BFD-RS configuration based on a control resource set (CORESET) confinement within the CFR for the or a CORESET association with at least one search space set used for monitoring. In yet another embodiment, detecting the beam failure incident of the first beam may include using a BFI counter that is separate from a unicast BFI counter. In one embodiment, the method may further include autonomously connecting to a second beam by the first device based on detecting the BFI. In another embodiment, the method may further include selecting, by the first device, the second beam based on at least one control resource set (CORESET) associated with the second beam, the at least one CORESET being associated with at least one beam. In still another embodiment, the method may further include communicating by the first device to the second device a Beam Failure Recovery Request (BFRQ) based on detecting the BFI. In yet another embodiment, communicating by the first device to the second device the BFRQ may using a Medium Access Control-Control Element (MAC-CE), an Uplink Control Information (UCI) or a Random Access Channel (RACH). In one embodiment, communicating by the first device to the second device may further include communicating information relating to at least one of a cell identification of the BFI, an identification of the associated with a failed beam, or a candidate recovery beam.

An example embodiment provides a wireless communication system that may include a Next Generation NodeB (gNB) and a User Equipment (UE). The gNB may be configured to send at least one Beam Failure Detection Reference (BFD-RS) configuration to the system. The UE may be configured to receive a Physical Downlink Control Channel (PDCCH) and a Physical Downlink Shared Channel (PDSCH) for communications in a Common Frequency Resource (CFR) and the at least one BFD-RS and may be configured to detect a Beam Failure Incident (BFI) of a first beam using the at least one BFD-RS configuration. In one embodiment, the configuration for the at least one BFD-RS is received by the UE and provides explicit information about the at least one BFD-RS configuration by higher-layer signaling. In another embodiment, the configuration for the at least one BFD-RS includes a maximum number of BFD-RSs. In still another embodiment, the configuration for the at least one BFD-RS provides implicit information to the gNB about the at least one BFD-RS configuration based on a control resource set (CORESET) confinement within a common frequency resource (CFR) for the system or a CORESET association with at least one search space set used for monitoring. In yet another embodiment, the UE may be configured to detect the beam failure incident of the first beam using a BFI counter that is separate from a unicast BFI counter. In one embodiment, the UE may autonomously connect to a second beam based on detecting the BFI. In another embodiment, the UE may select the second beam based on at least one control resource set (CORESET) associated with the second beam, the at least one CORESET being associated with multiple beams or a single beam. In still another embodiment, the UE communicates to the gNB a Beam Failure Recovery Request (BFRQ) based on detecting the BFI. In yet another embodiment, the UE communicates to the gNB the BFRQ using a Medium Access Control-Control Element (MAC-CE), an Uplink Control Information (UCI) or a Random Access Channel (RACH). In one embodiment, the UE may be configured to communicates to the gNB information relating to at least one of a cell identification of the BFI, an identification of the associated with a failed beam, or a candidate recovery beam.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
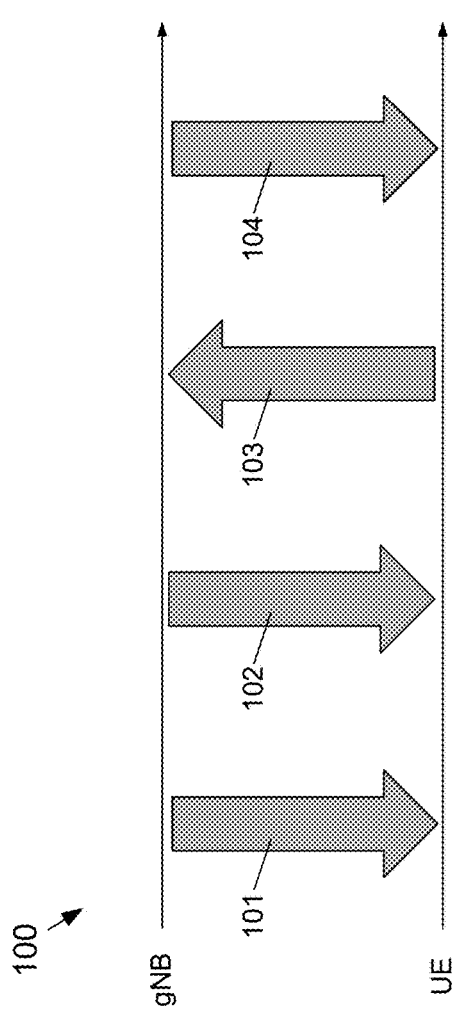
FIG. 1 depicts the main operations of a NR Rel. 15 and a Rel 16 BFR procedure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.).

Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

List of Some Acronyms Used Herein

| Abbreviation | Definition |
|---|---|
| BFD-RS | Beam Failure Detection-Reference Signal |
| BFI | Beam Failure Instance |
| BFR | Beam Failure Recovery |
| BFRQ | Beam Failure Recovery Request |
| BLER | Block Error Rate |
| BWP | BandWidth Part |
| CF-PRACH | Contention Free-Physical Random Access Channel |
| CFR | Common Frequency Resource |
| CORESET | Control Resource Set |
| CRC | Cyclic Redundancy Check |
| C-RNTI | Cell-Radio Network Temporary Identifier |
| CS-RNTI | Configured Scheduling-Radio Network Temporary Identifier |
| CSS | Common Search Space |
| DCI | Downlink Control Information |
| DRX | Discontinuous Reception |
| GC-PDCCH | Group Common-Physical Downlink Control Channel |
| gNB | Next Generation NodeB |
| MAC-CE | Medium Access Control-Control Element |
| MBS | Multicast and Broadcast Services |
| NDI | New Data Indication |
| NR | New Radio |
| PDCCH | Physical Downlink Control Channel |
| PDSCH | Physical Downlink Shared Channel |
| PRB | Physical Resource Block |
| PTM | Point to Multipoint |
| PTP | Point to Point |
| RA | Random Access |
| RLF | Radio Link Failure |
| RLM | Radio Link Monitoring |
| RRC | Radio Resource Control |
| SCell | Secondary Cell |
| SpCell | Special Cell |
| SPS | Semi-Persistent Scheduling |
| SR | Schedule Request |
| SS | Search Space |
| SSB | Synchronization Signal Block |
| TCI | Transmission Configuration Indicator |
| UCI | Uplink Control Information |
| UE | User Equipment |
| UL | Uplink |

Problem Statement

It is expected that the beams used for MBS activities may be different than the beams used for unicast activities. The beams used for MBS activities may be expected to be wider to cover multiple UEs, while the beams used for unicast activities may be expected to be narrower and more directed toward specific UEs. Therefore, there should be processes to enable an MBS UE to detect a failure of a MBS beam and distinguish a MBS beam failure from a failure of unicast beam, which may be important for a MBS beam recovery process. In contrast to a unicast case, a beam failure recovery for a MBS beam does not only aim to recover the failed MBS beam, but also aims to maintain the transmission for other UEs in the same MBS group. Therefore, more enhancements may be needed for the beam recovery of a failed MBS beam.

The subject matter disclosed herein provides techniques for configuring MBS beam failure detection reference signals, which may include processes to explicitly or implicitly configure MBS beam failure detection reference signals (BFD-RSs) that differ from unicast BFD-RSs; processes to increase the maximum number of BFD-RS that may be configured; and how the MBS BFD-RSs may be associated with a MBS service/group ID.

The subject matter disclosed herein also provides techniques for declaring a MBS beam failure, which may include flexible techniques for configuring counters/timers/thresholds that may be used to declare a MBS beam failure that differs from similar techniques used for unicast operations. In one embodiment, a process of declaring a MBS beam failure is independent of beam failure declaration process in unicast case. The mutual impact between the unicast beam failure process and MBS beam failure process is also considered herein. Accordingly, different MBS beam failure processes may be defined for different MBS services/groups.

The subject matter disclosed herein also provides transparent and non-transparent recovery processes that may be used by a UE may recover from a beam failure. A transparent recovery process may include configurations that allow a UE may autonomously recover from a beam failure without gNB involvement. A MBS search space may be associated with multiple control resource sets (CORESETs) to indicate potential candidate beams that may be used for beam recovery. In one embodiment, the MBS search space may be associated with a single CORESET, but with multiple transmission configuration indication-states (TCI-States) to indicate the potential candidate beams for recovery. For a non-transparent recovery process, a UE may indicate a failure of MBS beams to the gNB through, for example, a MAC-CE process, an uplink control information (UCI), and/or a Random Access Channel (RACH), and to identify a candidate MBS beam. Additional information that may also be provided may include an ID of a MBS service/group. In one embodiment, recover may be provided by switching between different MBS scheduling schemes. Unless stated otherwise, the transparent and non-transparent recovery processes may apply to a SpCell, a PCell, a PSCell, and/or a SCell.

Beam Failure Detection
Configuration BFD-RSs

To enable a UE to distinguish between a failure of a MBS beam or a unicast beam, a gNB may configure a UE using a different beam failure detection reference signal (BFD-RS). Such a configuration may be realized either explicitly or implicitly. That is, a gNB may explicitly or implicitly configure the UE with a different BFD-RS for a unicast beam failure and for a MBS beam failure.

In an explicit-configuration approach, a gNB may explicitly provide a UE with MBS BFD-RSs. In one embodiment, a gNB may provide a UE with a list of BFD-RS for MBS beams through higher-layer signaling, such as a RRC parameter MBS-failureDetectionResourcesToAddModList, which provides a list of reference signals for detecting MBS beam failure and/or radio link failure (RLF).

Alternatively, a gNB may indicate the purpose of BFD-RS for unicast beam failure detection, and/or RLF, and/or MBS beam failure detection through higher-layer signaling. For example, additional purposes such as "MBS-beamFailure" may be added to the existing RRC parameter purpose to indicate to the UE that the purpose of an associated reference signal is for unicast beam failure and/or RLF, or MBS beam failure. Additional values may be included to cover other combinations, such as MBS beam failure and RLF. For a SCell configured with MBS, the purpose parameter may be configured for unicast beam failure or MBS beam failure.

Alternatively, the purpose parameter may optional be for UEs configured with MBS and additional RRC parameter, such as purpose-MBS may be introduced to select from a MBS beam failure, a unicast beam failure, or both. This may be useful if some cells, e.g., SCells, are used for both unicast and MBS in which RLF is not needed. A UE does not expect to be configured with both RRC parameters, (purpose and purpose-MBS) for the same cell.

For explicit configuration, higher-layer parameters may be included in IE RadioLinkMonitoringConfig to indicate the purpose of the configured BFD-RS. An example IE RadioLinkMonitoringConfig in the pseudo code below shows some examples of the aforementioned RRC parameters. Note that not all the new aforementioned RRC parameters need be present.

```
-- ASN1START
-- TAG-RADIOLINKMONITORINGCONFIG-START
RadioLinkMonitoringConfig ::=           SEQUENCE {
    failureDetectionResourcesToAddModList    SEQUENCE (SIZE(1..maxNrofFailureDetectionResources))
OF RadioLinkMonitoringRS
OPTIONAL, -- Need N
    MBS-failureDetectionResourceToAddModList        SEQUENCE
(SIZE(1..maxNrofFailureDetectionResources)) OF RadioLinkMonitoringRS
OPTIONAL, -- Need N
    failureDetectionResourcesToReleaseList    SEQUENCE (SIZE(1..maxNrofFailureDetectionResources))
OF RadioLinkMonitoringRS-Id
OPTIONAL, -- Need N
    MBS-failureDetectionResourcesToReleaseList      SEQUENCE
(SIZE(1..maxNrofFailureDetectionResources)) OF RadioLinkMonitoringRS-Id
OPTIONAL, -- Need N
    beamFailureInstanceMaxCount             ENUMERATED {n1, n2, n3, n4, n5, n6, n8, n10}
OPTIONAL, -- Need R
    beamFailureDetectionTimer               ENUMERATED {pbfd1, pbfd2, pbfd3, pbfd4, pbfd5, pbfd6,
pbfd8, pbfd10} OPTIONAL, -- Need R
    ...
}
```

```
RadioLinkMonitoringRS ::=              SEQUENCE {
   radioLinkMonitoringRS-Id               RadioLinkMonitoringRS-Id,
   purpose                                ENUMERATED {beamFailure, rlf, both, MBS_beamFailure},
OPTIONAL, -- Optional for MBS UEs and is still mandatory for legacy UEs
   purpose-MBS                            ENUMERATED {MBS_beamFailure, Unicast_beamFailure,
both},
   detectionResource                      CHOICE {
      ssb-Index                              SSB-Index,
      csi-RS-Index                           NZP-CSI-RS-ResourceId
   },
   ...
}
-- TAG-RADIOLINKMONITORINGCONFIG-STOP
-- ASN1STOP
```

Alternatively, a gNB may implicitly provide a UE with different BFD-RSs for MBS beams in the absence of an explicit indication, or in combination with an explicit indication. The condition(s) under which a UE may implicitly derive the BFD-RS for MBS beams may be predefined, i.e., provided in the specification. For example, if a gNB provides N BFD-RS(s) for MBS beams, a UE may determine up to additional M BFD-RS(s) for MBS beams. This may achieve balance between signaling overhead and flexibility at the gNB because it may be expected to use more MBS beams than just unicast beams. A gNB may also provide value of N and M through higher layer signaling. If N is equal to zero, the aforementioned condition becomes: in case of the absence of explicit indication BFD-RS, a UE may determine M BFD-RS(s) implicitly.

Further, a gNB may indicate whether an explicit indication of BFD-RS may only be used or whether an explicit indication may be combined with an implicit indication through higher-layer signaling. In one embodiment, a gNB may use higher-layer signaling to indicate to a UE which approach is used to provide/determine BFD-RS for MBS beams. For example, a RRC parameter MBS_BFD_indication may be set to explicit, implicit, or a combination to indicate whether the BFD-RS(s) for MBS beams are signaled explicitly, determined implicitly, or combination of both.

For an implicit determination of BFD-RS(s) for MBS beams, a UE may apply rules that are similar to the rules used for a unicast beam in Clause 6 in 3GPP TS 38.213: "Physical layer procedures for control," Rel. 16, V16.4.0. More specifically, a UE may determine BFD-RS for MBS beam to include periodic CSI-RS resource configuration indexes with same values as the RS indexes in the RS sets indicated by TCI-State for respective CORESETs that the UE uses for monitoring MBS PDCCH and, if there are two RS indexes in a TCI state, the set includes RS indexes configured with qcl-Type set to "typeD" for the corresponding TCI states.

A UE may only assess the MBS beam quality using BFD-RSs that are QCLed with the DMRS of a MBS PDCCH monitored by the UE. In other words, a UE may only use BFD-RSs that have the same TCI-State of the CORESET in which a MBS PDCCH may be transmitted.

If the SS is only used for MBS PDCCH, the RSs that have the same TCI-State of the CORESET associated with this SS may only be considered for BFD-RSs for MBS beam assessment, but not for unicast beams.

To this end, a gNB may explicitly or implicitly label which CORESETs may be used to determine BFD-RS(s) for a MBS beam using one, or combination, an explicit RRC parameter in CORESET configurations or implicitly by containment/association in/with CFR.

Explicit RRC Parameter in CORESET Configurations

In this approach, a gNB may explicitly indicate the TCI-State of which particular CORESETs may be used for BFD-RS. For example, higher layer signaling such as a RRC parameter, MBS-reference may be included as part of ControlResourceSetId IE. If a gNB sets to MBS-reference to true, a UE may use the RS indicated by TCI-State of the CORESET to determine the BFD-RS for MBS beams. If not configured, or MBS-reference is set to false, a UE may not use the RS indicated by TCI-State of this CORESET to determine the BFD-RS for MBS beams.

A gNB may explicitly indicate to a UE which particular CORESET(s) may be used to determine BFD-RS for MBS beams.

Explicit RRC Parameter in the Search Space

In this approach, a UE may use a CORESET associated with particular SS to determine the BFD-RS for MBS beams. That is, a gNB may explicitly indicate the SS having a CORESET that may be used to determine a BFD-RS for MBS beams. In one embodiment, a gNB may explicitly indicate to a UE which SS may be used through higher-layer signaling, such as a RRC parameter MBS-reference may be included as part of a SearchSpace IE. If a gNB sets a MBS-reference to be true, a UE may use the RS indicated by the TCI-State of the CORESET associated with the SS to determine the BFD-RS for MBS beams. If not configured, or MBS-reference is set to be false, a UE may not use the RS indicated by TCI-State of the CORESET associated with the SS to determine the BFD-RS for MBS beams.

Alternatively, if new DCI formats are introduced for MBS and any of the DCI formats are included in the configured SS, then a UE may use the RS indicated by TCI-State of the CORESET associated with this SS to determine the BFD-RS for MBS beams. That is, if a SS configuration includes any new DCI formats for MBS, the CORESET associated with the SS may be used to determine the BFD-RS for MBS beams. Alternatively, if a UE decodes any DCI that schedules or triggers MBS transmission (e.g., legacy DCI formats with new cyclic redundancy check (CRC) scrambling RNTI for MBS, legacy DCI format that are repurposed for MBS scheduling, etc.), the UE may use the RS indicated by TCI-State of the CORESET associated with this SS to determine the BFD-RS for MBS beams. Moreover, if a new search space is introduced for MBS, e.g., new common SS (CSS) for MBS, or any other SS that is indicated to be used for MBS, the UE may use the RS indicated by TCI-State of the CORESET associated with this SS to determine the BFD-RS for MBS beams.

Implicitly by Containment/Association in/with CFR

Figure 2:
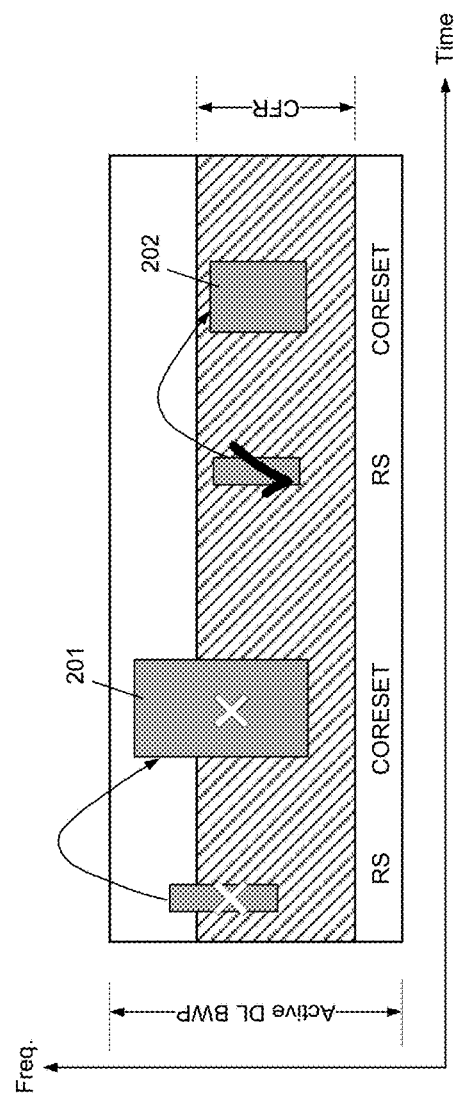
FIG. 2 depicts an example CFR used for MBS activities within an associated unicast BWP, which is indicated as an Active downlink (DL) BWP.

For this process, any CORESET fully confined within MBS CFR may be used by a UE to determine the BFD-RS of MBS beams. FIG. 2 depicts two example CORESETs in which a CORESET 201 is not fully confined within the MBS CFR, whereas a CORSET 202 is fully confined within the MBS CFR. If the number of CORESETs confined within MBS CFR is greater than particular threshold, a UE may be expected to use RS indexes indicated by TCI-State of the CORESETs in ascending/descending order of their ID until reaching the threshold. Additional details are provided below regarding to determine/indicate that threshold. The CORESETs may be used to carry MBS PDCCH or not to carry MBS PDCCH. Also, other rules may be applied to determine which CORESETs may be used to determine the BFD-RSs for MBS beams.

Alternatively, the CORESETs associated with the SSs in which a UE may monitor MBS PDCCH may be used by the UE to determine BFD-RSs for MBS beams. Here, the CORESET may not be fully confined within CFR, which may be the case when a Point-to-Multipoint (PTM) scheme 2 is, for example, used to schedule MBS PDSCH.

Additionally, CORESETs of search spaces associated with MBS CFR may be used to determine the BFD-RS for MBS beams. For example, if a MBS CFR is defined as a MBS BWP or is defined as a MBS region of contiguous RBs, then the CORESETs of the search spaces configured by PDCCH-config for MBS (that may be separate from the PDCCH-config of the dedicated unicast BWP) may be used to determine the BFD-RS for MBS beams. Also, the CORESETs configured by PDCCH-config for MBS can be used to determine the BFD-RS for MBS beams.

When the number of the configured CORESETs that are associated with a MBS CFR is greater than particular threshold, a UE may be expected to use RS indexes indicated by TCI-State of the CORESETs in an ascending or a descending order of their ID until reaching the particular threshold. Additional details are provided below regarding how to determine/indicate a threshold. Also, other rules may be applied to determine which CORESETs may be used to determine the BFD-RSs for MBS beams.

In NR Rel. 15/16, a UE expects to be configured with at most two BFD-RSs for unicast beam per BWP for the purpose beamFailure or both (beam failure+RLM). To avoid any negative impact on the quality of unicast beams, a new threshold may be defined for the number of BFD-RS for MBS, which may be denoted herein as $N_{MBS\_LR}$ in which "LR" stands for link recovery. The value of $N_{MBS\_LR}$ may be predefined, provided in the specification, or indicated through higher-layer signaling. For example, $N_{MBS\_LR}$ may be equal to two BFD-RSs for MBS beams.

Alternatively, as part of capability signaling, a UE may indicate to a gNB the maximum supported number of BFD-RSs for MBS beams. In this case, a UE does not expect a gNB to configure the UE with BFD-RSs for MBS beams greater than the indicate value.

An additional column, as shown in Table 1 below, may be added to Table 5-1 in 3GPP TS 38.213: "Physical layer procedures for control," Rel. 16, V16.4.0. Table 5-1 in 3GPP TS 38.213 provides the thresholds that define the maximum number of RSs that may be configured for RLM and unicast beam failure ($N_{LR\_RLM}$) from which ($N_{RLM}$) RSs may be used from RLM. The additional column may be for $N_{MBS-LR-RLM}$ to provide the maximum number of RSs that may be used for MBS beam failure, unicast beam failure and RLM. The column $N_{LR-RLM}$ may be interpreted as the maximum number of RS for a unicast beam and RLM, as same as in NR Rel. 15/16.

TABLE 1

The values of $N_{MBS-LR-RLM}$, $N_{LR-RLM}$, $N_{RLM}$ as a function of maximum $L_{max}$ of synchronization signal block (SSB) per half frame.

| $L_{max}$ | $N_{MBS-LR-RLM}$ | $N_{LR-RLM}$ | $N_{RLM}$ |
|---|---|---|---|
| 4 | 4 | 2 | 2 |
| 8 | 8 | 6 | 4 |
| 64 | 10 | 8 | 8 |

A UE may assume that set of BFD-RSs for a unicast beam and the set of BFD-RSs for a MBS beam are disjoint sets, i.e., the same RS may not be used for both a unicast beam and a MBS beam. Alternatively, if a gNB configures the same BFD-RS for unicast beams and MBS beams, a UE may not count this RS towards the maximum number of BFD-RSs for MBS beams. Instead, this BFD-RS is counted towards the maximum number of BFD-RSs for unicast beams.

The BFD-RSs may also depend on the MBS service, which may be beneficial if a UE is a member in multiple MBS groups and a gNB uses different beams for different MBS services/groups. Therefore, failure of the MBS beam of particular service or group does not necessarily mean the failure of the MBS beams of other services or groups. To this end, if a gNB provides a UE with MBS BFD-RSs, a gNB may also provide the identity of the associated MBS group or service. The example MBS-BFD-RS IE below shows how to associate MBS BFD-RS with MBS service/group ID. Note that similar configurations may be provided as part of other IEs, such as RadioLinkMonitoringConfig IE. Also, an additional RRC parameter may be included for other functionality, such as purpose to indicate whether the indicated RS is for beam failure only, RLF or both.

The maximum number of MBS BFD-RS for all configured MBS services/groups (maxMBSBFD_RS) may be predefined, i.e., provided in the specification, or configured through higher-layer signaling, or indicated by a UE through capability signaling, or derived based on the number of configured MBS services/groups. Moreover, the field MBS_group_serivce indicates the MBS service(s)/group(s) associated with the indicated BFD-RS. Generally, the same BFD-RS may be associated with multiple MBS services/groups up to the maximum number of configured MBS services/groups (maxMBS_group_services). The value of maxMBS_group_services may be predefined, i.e., provided in the specification, or configured through higher-layer signaling, or indicated by the UE through capability signaling, or derived based on the number of configured MBS services/groups.

The following is example pseudo code for an IE for associating BFD-RSs with a MBS service/group.

```
-- ASN1START
-- TAG-MBS-BFD-RS-START
MBS-BFD-RS ::= SEQUENCE {
    MBS-BFD-RS-List    SEQUENCE (SIZE(1..maxMBSBFD_RS)) OF MBS-BFD-RS    OPTIONAL, --
```

```
Need M
    ...
}
MBS-BFD-RS ::=          SEQUENCE {
    Reference_signal        CHOICE {
        ssb                     SSB-Index,
        csi-RS                  NZP-CSI-RS-ResourceId
    },
    MBS_group_service       SEQUENCE (SIZE(1..maxMBS_group_services)) OF        MBS_ID
OPTIONAL -- Need R
}
-- TAG-MBS-BFD-RS-STOP
-- ASN1STOP
```

Timer and Counter for Declaring Beam Failure

A physical layer of a UE reports separate beam failure instances (BFI) of MBS beam failure instances to a higher layer of the UE that differ from the BFI of unicast beam failure instance. This may enable the higher layer of the UE to take the corrective action based on which beam (a unicast beam, a MBS beam, or both) fails. A process that is similar to the process used for unicast beam failure, in Clause 6 in 3GPP TS 38.213: "Physical layer procedures for control", Rel. 16, V16.4.0, may be applied, i.e., the physical layer of a UE informs the higher layer of the UE if the quality of MBS beam may be worse than particular threshold with a periodicity equal to the max (the smallest periodicity of BFD-RSs for MBS, N msec), in which N may be predefined or provided through higher-layer signaling.

Given the different nature of a MBS beam compared with a unicast beam, a gNB may configure a UE with another threshold, e.g., denoted herein by $Q_{MBS, LR}$, to assess the quality of MBS beam differ from the threshold $Q_{out, LR}$ used for assessment of a unicast beam. $Q_{MBS, LR}$ may be based on a hypothetical BLER and a gNB may provide which threshold value may be applied. Alternatively, another RRC parameter similar to rlmInSyncOutOfSyncThreshold may be used. If absent, a UE applies the same hypothetical BLER threshold used for the threshold of unicast beam. Moreover, other metrics may be used for the assessment of MBS beam quality that differ from the metrics used for a unicast beam quality assessment, e.g., for example, RSRP, SINR, etc., and the associated threshold value may be provided to a UE through higher-layer signaling. The indication periodicity of the MBS beam failure instance may be as same as, or different from, the indication periodicity of the unicast beam failure instance.

Figure 3:
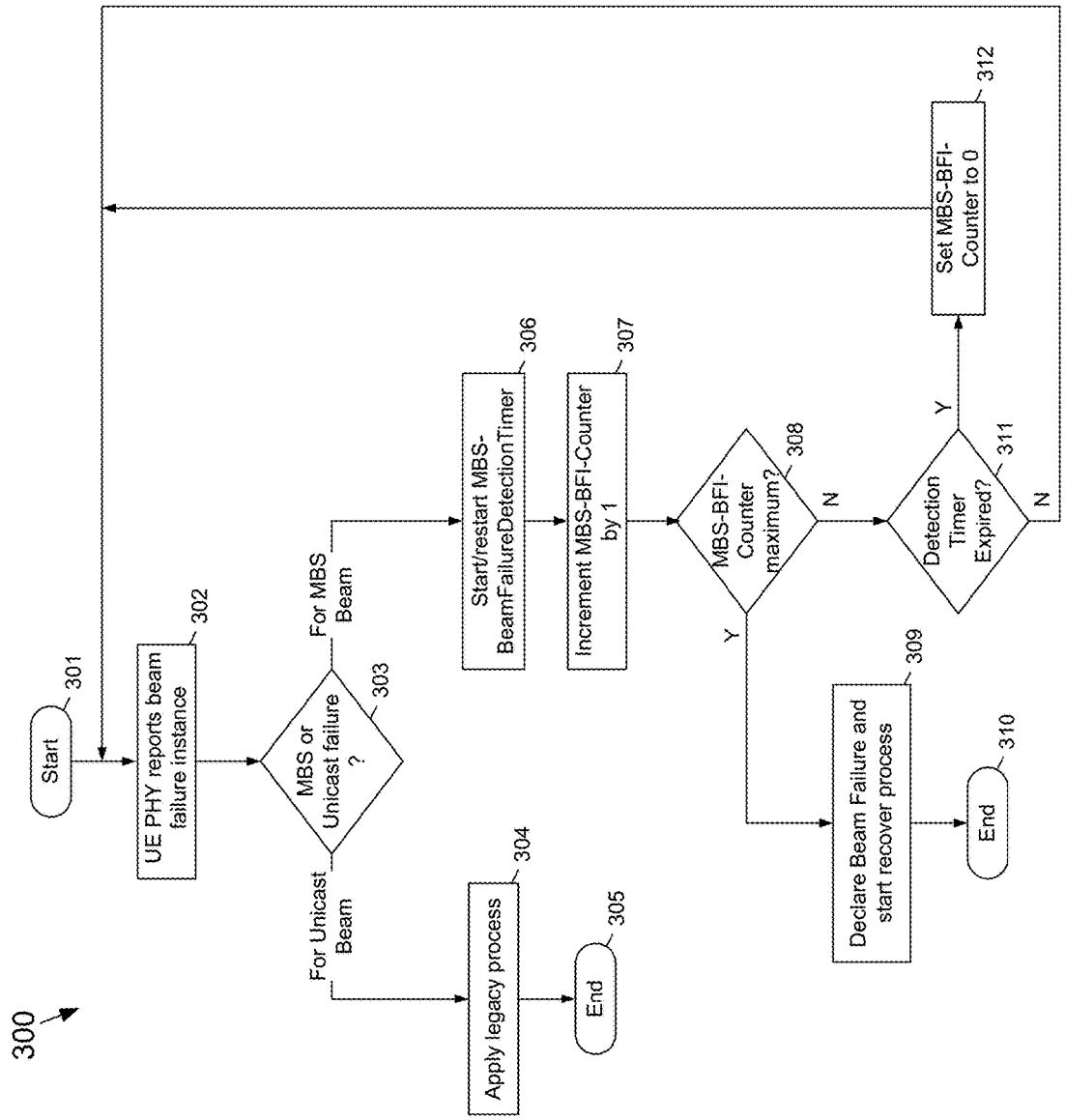
FIG. 3 is a flowchart of an example embodiment of a process for two independent processes that may be run simultaneously by a UE for a legacy unicast-beam-failure detection and for a MBS beam-failure detection according to the subject matter disclosed herein.

FIG. 3 is a flowchart of an example embodiment of a process 300 for two independent processes that may be run simultaneously by a UE for a legacy unicast-beam-failure detection and for a MBS beam-failure detection according to the subject matter disclosed herein. Details regarding impacts of unicast and MBS beam-failure detection processes on each other are provided below.

The process 300 starts at 301. At 302, a PHY layer of a UE reports a beam failure instance to a higher layer of the UE. At 303, the UE or a higher layer of the UE determines whether the beam failure instance is based on a unicast beam failure or a multicast beam failure. If the beam failure instance is based on a unicast beam failure, flow continues to 304 where the UE applies a legacy beam recovery process. Flow continues to 305, where the process ends.

If, at 303, the beam failure instance is based on a multicast beam failure, flow continues to 306 where the UE may start a dedicated timer for MBS beam failure, e.g., MBS-beamFailureDetectionTimer. In one embodiment, a gNB may configure the UE with the MBS-beamFailureDetectionTimer. In another embodiment, the value of the MBS-beamFailureDetectionTimer may be configured by the gNB through higher-layer signaling provided by a RRC from the gNB to the UE. In still another embodiment, the value of the MBS-beamFailureDetectionTimer may be defined relative to the reporting period of MBS beam failure instance. In one embodiment, the value of the MBS-beamFailureDetectionTimer is defined in the specification, and the timer is running at the UE based on the definition in the specification. In yet another embodiment, if the value of the MBS-beamFailureDetectionTimer has not been provided, the UE may apply the same value as the unicast beamFailureDetectionTimer relative to the reporting period of MBS failure instance.

At 307, a dedicated MBS-BFI-Counter may be incremented by the UE or a higher layer of the UE by one for each reported MBS beam failure instance. Flow continues to 308 where the UE or a higher layer of the UE determines whether the MBS-BFI-Counter has reached a maximum value. In one embodiment, the gNB may provide a UE with maximum value of the MBS-BFI-Counter through higher-layer signaling. In another embodiment, a UE may assume the maximum value for the MBS-BFI-Counter is equal to the corresponding counter of the unicast beam, if it is not provided by gNB. If, at 308, the UE or a higher layer of the UE determines that the maximum value has been reached, flow continues to 309 where the UE declares a MBS beam failure and commences with a MBS beam recovery process. Flow then continues to 310 where the process ends. If at 308, the UE or a higher layer of the UE determines that the MBS-BFI-Counter has not reached the maximum value, flow continues to 311 where the UE or a higher layer of the UE determines whether a MBS-beamFailureDetectionTimer has expired. If not, flow returns to 302 where the UE may continue to increment the MBS-BFI-Counter if any such failure is reported. If, at 311, the MBS-beamFailureDetectonTimer has expired, flow continues to 312 where the MBS-BFI counter is set to 0 and assumes that the MBS beam has been restored. Flow then continues to 302.

Although in the example process 300 it has been shown that MBS beam failure detection process runs independent of the unicast beam failure detection process, there may be impacts on each respective beam failure detection process. For example, if a UE detects a unicast beam failure, i.e., the maximum number of unicast beam failure instances is reached, but the UE does not detect a MBS beam failure yet, then the UE may declare the failure of both unicast and MBS beams. The same may be applied if a UE detects a MBS beam failure before a unicast beam failure. That is, if a UE detects a unicast beam failure or a MBS beam failure, the UE may declare beam failure on both beams. In some cases, this may be beneficial if, for example, the recovery processes of MBS beams and unicast beams are different, then a UE may trigger both schemes if the failure of a MBS beam or a unicast beam is detected.

Also, the example process 300 shows that a MBS beam failure detection process may include a dedicated MBS-beamFailureDetectionTimer and a MBS-BFI counter, the same timer and/or the same counter may be used for unicast and MBS beam failure detection. For example, one timer may be used for both processes. In such a situation, the timer may be started/restarted if the PHY layer of a UE reports beam failure instance of a unicast beam or of a MBS beam. Upon the expiry of the timer, both the unicast BFI-counter and the MBS-BFI-counter may be set to zero.

Similarly, a UE may use the same counter for unicast beam failure instances and MBS beam failure instances. In other words, a UE may increment the counter by "1" upon the reception of beam failure instance report from a PHY of a UE regardless it is for a unicast beam failure or a MBS beam failure. Upon reaching the maximum configured value, beam failure of both unicast beams and MBS beams may be declared.

The aforementioned beam-failure detection processes may be extended to a case for different MBS services/groups. For example, MBS beam-failure instances may differ from one MBS service/group due to different reliability and latency requirements. This may be provided through higher-layer signaling, as shown by the example pseudo code below.

```
-- ASN1START
-- TAG-RADIOLINKMONITORINGCONFIG-START
RadioLinkMonitoringConfig ::=            SEQUENCE {
    failureDetectionResourcesToAddModList    SEQUENCE (SIZE(1..maxNrofFailureDetectionResources))
OF RadioLinkMonitoringRS
OPTIONAL,                                -- Need N
    failureDetectionResourcesToReleaseList   SEQUENCE (SIZE(1..maxNrofFailureDetectionResources))
OF RadioLinkMonitoringRS-Id
OPTIONAL,                                -- Need N
    beamFailureInstnaceMaxCount              ENUMERATED {n1, n2, n3, n4, n5, n6, n8, n10}
OPTIONAL,                                -- Need R
    MBSBeamFailureInstanceMaxCount           SEQUENCE (SIZE(1..maxMBS_group_services)) OF  BFI_MaxCount
OPTIONAL,
    beamFailureDetectionTimer                ENUMERATED {pbfd1, pbfd2, pbfd3, pbfd5, pbfd6,
pbfd8, pbfd10}                           OPTIONAL, -- Need R
    MBSbeamFailureDetectionTimer             SEQUENCE (SIZE(1..maxMBS_group_services)) OF  BFD_Timer
OPTIONAL,
    ...
}
BFI_MaxCount::=                          SEQUENCE {
    beamFailureInstanceMaxCount              ENUMERATED {n1, n2, n3, n4, n5, n6, n8, n10}
    MBS_group_service                        MBS_ID
OPTIONAL                                 -- Need R
}
BFD_Timer::=                             SEQUENCE {
    beamFailureDetectionTimer                ENUMERATED {pbfd1, pbfd2, pbfd3, pbfd4, pbfd5, pbfd6,
pbfd8, pbfd10}                           OPTIONAL, -- Need R
    MBS_group_service                        MBS_ID
OPTIONAL                                 -- Need R
}
RadioLinkMonitoringRS ::=                SEQUENCE {
    radioLinkMonitoringRS-Id                 RadioLinkMonitoringRS-Id,
    purpose                                  ENUMERATED {beamFailure, rlf, both},
    detectionResource                        CHOICE {
        ssb-Index                                SSB-Index,
        csi-RS-Index                             NZP-CSI-RS-ResourceId
    },
    ...
}
-- TAG-RADIOLINKMONITORINGCONFIG-STOP
-- ASN1STOP
```

A similar approach may also be applied for the threshold used for declaring beam failure, e.g., a hypothetical BLER in which each MBS service/group may be associated with different thresholds for declaring beam failure. The different thresholds for different MBS services/groups may be able to accommodate different liabilities and latencies requirements for each MBS service so that a UE may run independent MBS beam failure detection processes for the different MBS services/groups. In one embodiment, a gNB may configure the different thresholds separately.

The aforementioned approaches for declaring beam failure may be extended to a case in which beam failure detection depends on MBS service/group. One straight forward extension may be to have parallel beam failure detection processes running at the same time in which a failure of the MBS beam associated with particular MBS service does not affect the beam failure process of another MBS service.

As one possibility, declaring a beam failure for a particular MBS service may trigger a beam failure of other MBS services even though the maximum number of beam failure instance of the MBS services have not been reached yet. A UE may determine which MBS service to declare beam failure due to a beam failure of another MBS service based on rules and/or based on configurations. For example, if MBS services are determined according to their priorities, then if a beam failure is declared for a particular MBS service having a certain priority level, then the beams of all other MBS services having higher priority levels may be assumed to also be failed.

Also, a gNB may provide a UE with sets of relevant MBS services/groups through higher-layer signaling. For example, the following sets may be configured based on MBS service ID, $S_0=\{1, 3\}$, $S_1=\{1, 2, 4, 3\}$, $S_2=\{5, 7, 8\}$. For any particular set, if the beam of any MBS service/group fails, then a UE may assume that the beams for all MBS services in the same set are failed as well. For this example, if the beam of MBS service 4 in $S_1$ fails, then a UE may assume that the beams of MBS services 1, 2, and 3 fail as well.

Recovery Process

Transparent Recovery Process

Figure 4:
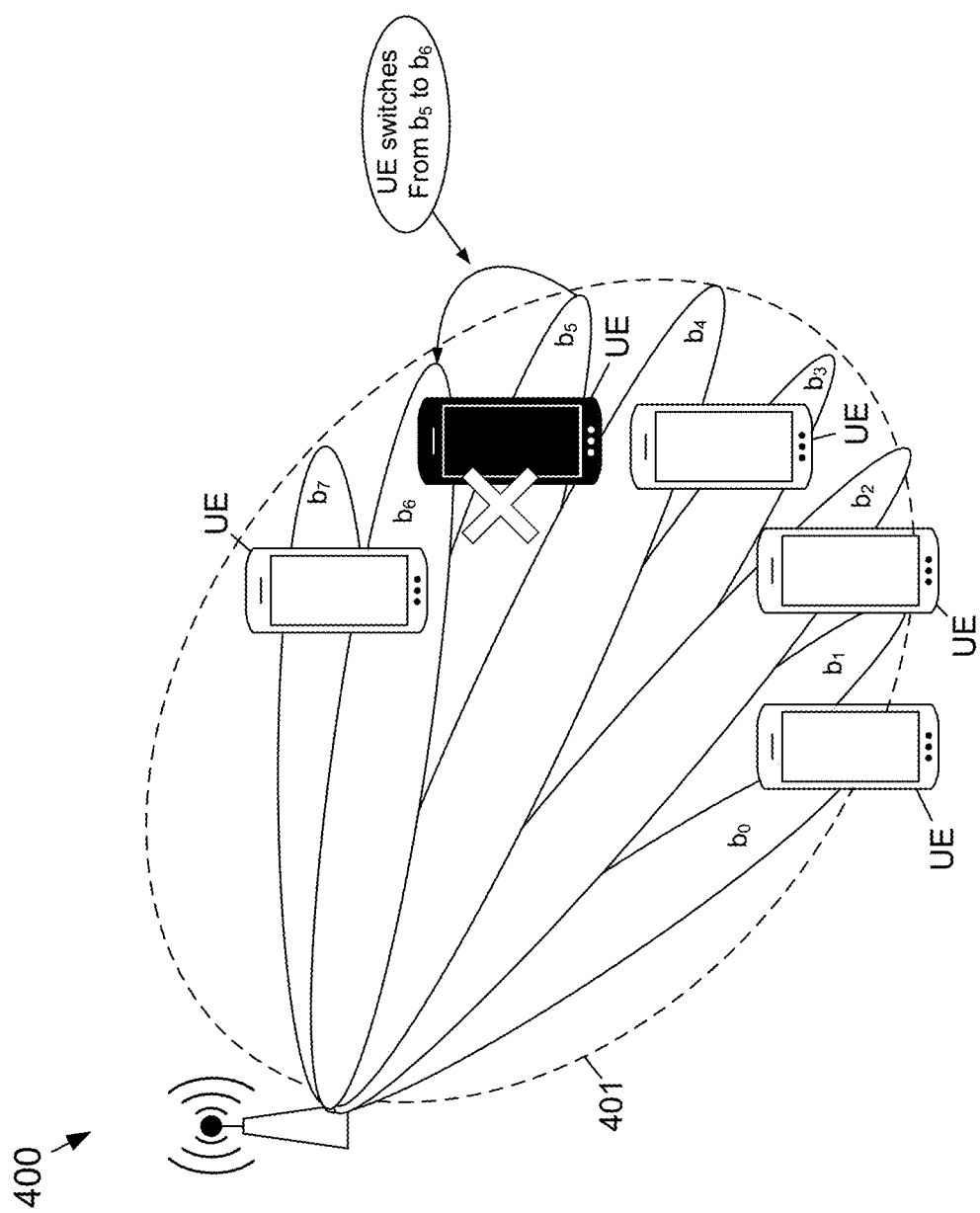
FIG. 4 depicts a system in which multiple narrow beams $b_0$-$b_7$ are used to serve a group of MBS UEs instead of using a wide beam covering all of the UEs of the MBS group.

In a transparent recovery process, a gNB may not be aware of a MBS beam failure on the UE side. That is, a UE does not transmit a beam failure recovery request (BFRQ) to the gNB. To this end, a MBS PDCCH may be transmitted on multiple beams. FIG. 4 depicts a system 400 in which multiple narrow beams $b_0$-$b_7$ are used to serve a group of MBS UEs instead of using a wide beam covering all of the UEs of the MBS group. A virtual beam 401 is indicated that shows the MBS UE group intended to be covered by a MBS. The different (actual) beams $b_0$-$b_7$ may be transmitting the same content or different contents. For example, each beam may carry different MBS PDCCH in which each PDCCH indicates the same MBS PDSCH downlink assignment, but each MBS PDCCH provides a different QCL parameter of the scheduled MBS PDSCH. Other parameters of MBS PDSCH may vary as well from beam to beam, such as TDRA, FDRA, MCS, etc.

In this scenario of system 400, when a UE determines a MBS beam failure using any of the previously described processes, or any other process (e.g., the quality of serving MBS beams fall below particular threshold), a UE may autonomously switch to another beam that is determined to be used for the same MBS service. For example, this is depicted in FIG. 4 in which the UE shown in black detects a failure of MBS beam $b_5$ (indicated by an "X") and also determines that beam $b_6$ may be a good replacement beam. In this transparent recovery process, the blackened UE autonomously switches from beam $b_5$ to beam $b_6$.

Figure 5:
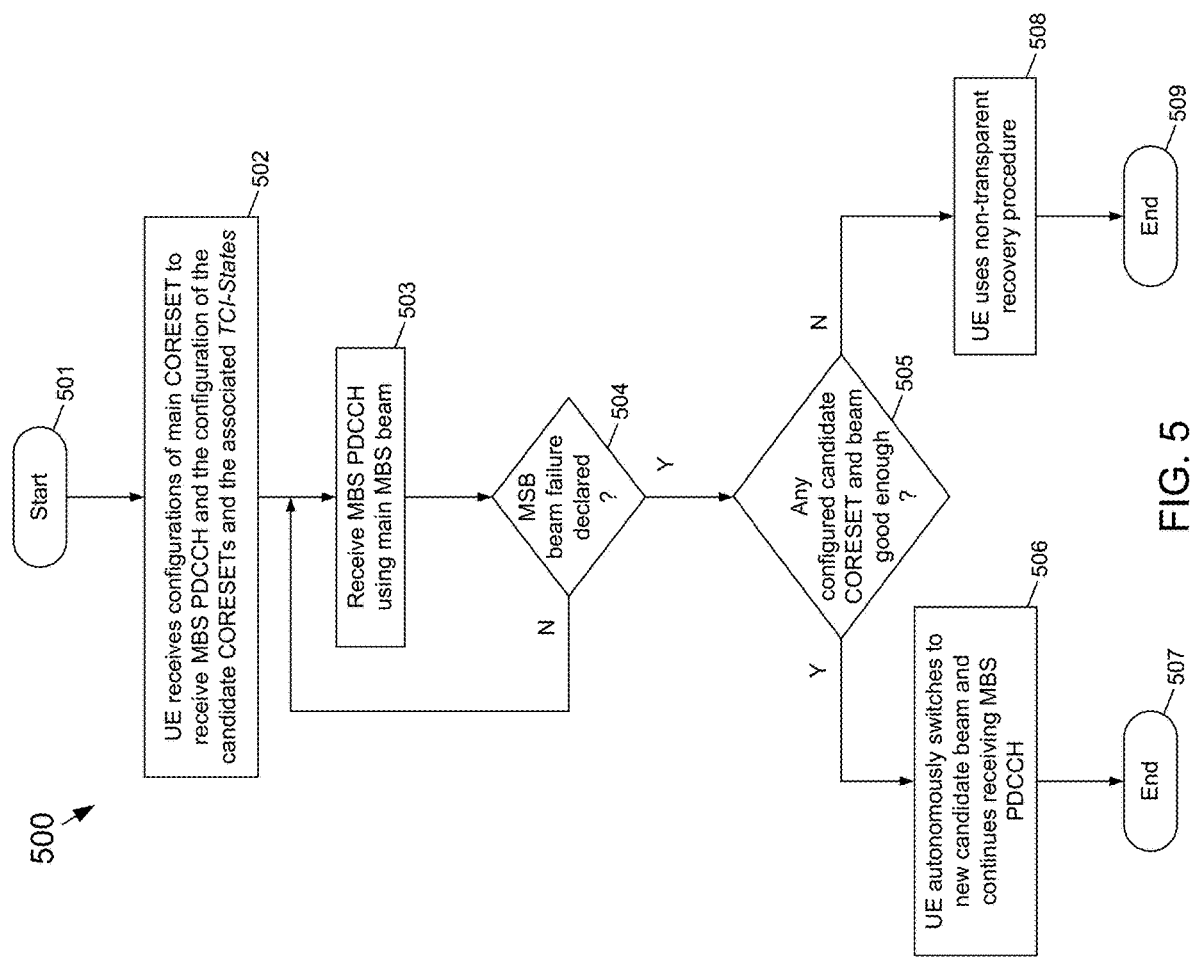
FIG. 5 is a flowchart of an example embodiment of a process for a transparent recovery process according to the subject matter disclosed herein.

FIG. 5 is a flowchart of an example embodiment of a process for a transparent recovery process 500 according to the subject matter disclosed herein. The process 500 starts of 501. At 502, a UE receives configurations of a default/main CORESET and the TCI-State that the UE should apply to receive MBS PDCCH, which corresponds to beam $b_5$ in FIG. 4 for this example. Moreover, the UE may be provided with candidate beams for the reception of MBS PDCCH upon the failure of beam associated with the default/main CORESET. This corresponds to, for example, candidate beams $b_0$-$b_4$, $b_6$ and $b_7$ in FIG. 4. Additional details are provided below regarding how to provide configurations of the main beam and candidate beams.

At 503, the UE continues to use the beam associated with default/main CORESET. Flow continues to 504 where it is determined whether a MSB beam failure has been declared. If not flow returns to 503. If, at 504, a MSB beam failure has been declared, flow continues to 505 where the UE assesses the quality of the candidate MBS beams. Additional details are provided on how such assessment may be performed below. If a good candidate beam is identified at 505, flow continues to 506 where the UE autonomously switches to the good candidate beam to continue the reception of MBS PDCCH. Flow then continues to 507 where the process ends.

If, at 505, no candidate beams are identified, flow continues to 508 where the UE may start non-transparent recovery process, which is described below. Flow then continues to 509 where the process ends.

When the quality of beam associated with default/main CORESET $b_5$ in FIG. 4, for example, falls below particular threshold, the UE may autonomously select another recovery beam from the candidate beam set, e.g. $\{b_0, b_1, b_2, b_3, b_4, b_6, b_7\}$ in FIG. 4. In this case, the new beam, for example, beam $b_6$ in FIG. 4, may be considered to be default/main beam, and the failed beam $b_5$ is added to the candidate beam set, which becomes the beam set $\{b_0, b_1, b_2, b_3, b_4, b_5, b_7\}$ after $b_6$ has been removed from the candidate beam set. It may be beneficial to make such differentiation between the active beam labeled by "default/main beam" and the candidate beams set because this may determine how different beam are assessed and which RSs may be used to determine their quality, as described below. The RS associated with the main beam may be used as a BFD-RS. Moreover, after receiving the configurations, the UE may start using the default beam, which is determined based on the rules described below.

More specifically, the default beam may be the beam that UE assumes for the reception of DL MBS transmission, e.g., MBS PDCCH, after receiving the configurations or the MAC-CE activating particular TCI-State command. In case of an absent of explicit configuration or on the top of explicitly configured BFD-RSs, the UE may use the TCI-State of that beam to determine the set of BFD-RSs. Later, if the default beam fails and the UE identifies another beam to be used for the reception of DL MBS transmission, e.g., MBS PDCCH, then the later-identified beam is labeled as the main beam. The UE uses the TCI-State of this main beam to update both sets of BFD-RSs and candidate beam RSs.

The explicit configurations of BFD-RSs may be realized using the aforementioned processes, or any other process, to explicitly provide the BFD-RSs of at least the default beam.

If the UE changes the default beam to another beam, the set of BFD-RSs may be updated as described below.

Such labeling is, however, not important as long as the UE may determine which respective RSs may be used to assess the quality of the serving and candidate beams to declare beam failure and determine the best recovery beam.

SS Associated with Multiple CORESETs

The techniques disclosed herein may be applied on different MBS scheduling schemes, although focus is primarily on a point-to-multipoint (PTM) scheme 1 that uses a group common-physical downlink control channel (GC-PDCCH) to schedule MBS PDSCH for a group of MBS UEs. In one embodiment, the search space of MBS may be associated with multiple CORESETs that may be associated with different TCI-States that may be determined by MAC-CE and/or RRC configurations.

In this embodiment, although a UE is monitoring a CORESET with particular TCI-State, other UEs in the same MBS group are expected to be monitoring other candidate CORESETs associated with the same/different SS based on their TCI-states, which can in general be different. This may allow a gNB a flexibility to configure the different CORESETs to occupy different time/frequency resources, and may significantly simplify the DL beam construction operation on the gNB side. In other words, different MBS beams may carry different MBS PDCCH in CORESETs that occupy different time/frequency resources. Consequently, a gNB may schedule different MBS PDSCHs for the same MBS service on different beams targeting different UEs in the same MBS group.

In NR Rel. 15/16, the SearchSpace IE provides a UE with the monitoring periodicity of PDCCH and the first symbol within the slot to monitor PDCCH from where the CORESET starts. For the SS that may be associated with multiple CORESETs with different TCI-States, a gNB may indicate time offset between the CORESETs to ensure no overlapping at least in the time domain.

Figure 6:
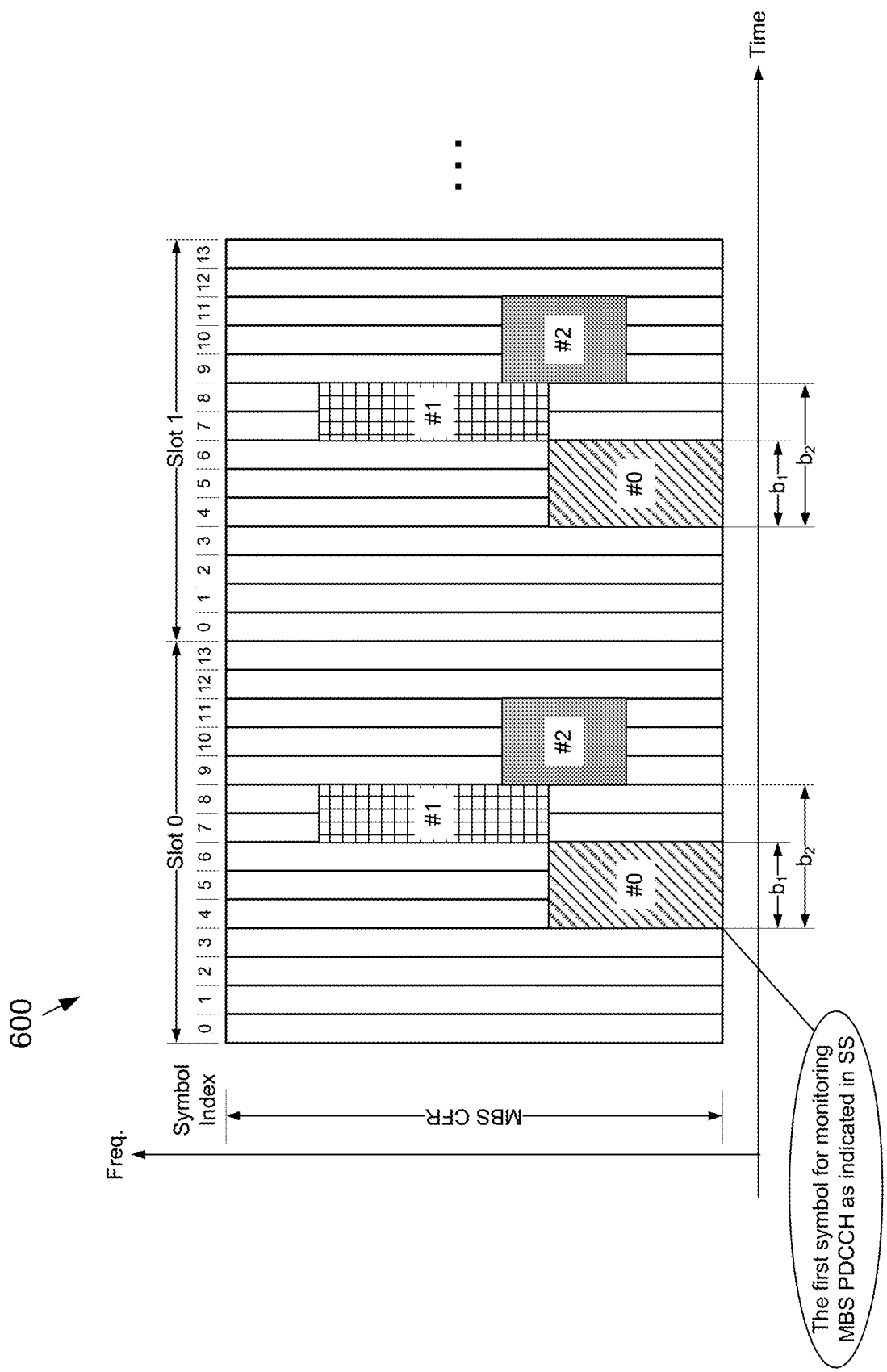
FIG. 6 depicts an example embodiment of a MBS Search Space having multiple CORESETs associated with different beams that have no overlapping in the time domain according to the subject matter disclosed herein.

FIG. 6 depicts an example embodiment of a MBS SS 600 having multiple CORESETs associated with different beams that have no overlapping in the time domain according to the subject matter disclosed herein. In FIG. 6, an example monitoring periodicity is set to one slot and PDCCH monitoring starts from OFDM symbol 4. The SS 600 may be associated with three CORESETs having different TCI-States, i.e., beam #0, beam #1 and beam #2. In this case, the UEs monitoring beam $b_0$ should use the CORESET #0 that starts from OFDM symbol 4 having a duration of 3. The UEs monitoring beam $b_1$ should use the CORESET #1 that starts from OFDM symbol 7 having a duration of 2. The UEs monitoring beam $b_2$ should use the CORESET #2 that starts from OFDM symbol 9 having a duration of 3.

The offset value for CORESETs associated with different beam may be derived according to rules. For example, a UE may assume that the CORESETs associated with different beams are contiguous in time as shown FIG. 6 depending on the beam index. Alternatively, an offset value may be indicated through higher-layer signalling as part of, for example, a SearchSpace IE or a ControlResourceSet IE. The offset may be relative to the first OFDM symbol with the slot containing the monitoring occasion or relative to the indicated first symbol within the slot to monitor PDCCH, as shown in FIG. 6.

The SS 600 associated with MBS activities may be linked to multiple CORESETs, as shown in example pseudo code for SearchSpace IE below. Instead of providing one associated CORESET ID as in NR Rel. 15/16, a gNB may provide a list of the associated CORESET IDs. That is, the MBS search space may be associated with multiple CORESETs each having different TCI-States. Only one CORESET may be used at a time and the CORESET used may be determined according rules. For example, a UE may use the CORESET having the lowest/highest ID as the default CORESET that the UE uses for the reception of MBS PDCCH. The size of the list maxNrofCORESETs may be predefined, i.e., provided in the specification, or the UE indicates the size of the list to a gNB as part of capability signaling for the UE. Example pseudo code follows for a gNB to provide a list of CORESETs to a UE.

```
-- ASN1START
-- TAG-SEARCHSPACE-START
SearchSpace ::=                SEQUENCE {
   searchSpaceId              SearchSpaceId,
   controlResourceSetId       SEQUENCE(SIZE (1..maxNrofCORESETs)) OF
ControlResourceSetId                  OPTIONAL,  -- Cond SetupOnly
   --[Irrelevant fields have been omitted]-
}
-- TAG-SEARCHSPACE-STOP
-- ASN1STOP
```

Moreover, a gNB may use the RRC parameter controlResourceSetId in the same approach as NR Rel. 15/16 to indicate only the ID of one CORESET, which may be used as the default/main CORESET. The gNB may provide a UE with other IDs of candidate CORESET that may be used upon the beam failure of the default/main CORESET through other higher-layer signaling, such as RRC parameter Candidate-controlResourceSetId. The maximum number of the candidate CORESETs that may be configured may predefined, i.e., provided in the specification, or a UE indicates the maximum number of candidate CORESETs to a gNB as part of the capability signaling of the UE.

Alternatively, a gNB may use the RRC parameter controlResourceSetId in a same approach as NR Rel. 15/16 to indicate just the ID of one CORESET that may be used as the default/main CORESET. Then, the UE may derive the IDs of the candidate CORESETs according to rules. For example, the CORESETs having consecutive IDs starting from the ID of default/main CORESET+1 to the CORESET ID that is the min(highest configured CORESET ID, ID of default/main CORESET+maximum number of the candidate CORESETs). The maximum number of the candidate CORESETs that may be configured may be predefined, i.e., provided in the specification, configured through higher-layer signaling or a UE indicates the maximum number of the candidate CORESETs to a gNB as part of capability signaling of the UE.

A UE may determine the set of MBS BFD-RSs to include RS indexes with same values as the RS indexes in the RS sets indicated by TCI-State for default/main CORESETs that the UE uses for monitoring MBS PDCCH.

A UE may only assess the MBS beam quality using BFD-RSs that are QCLed with the DMRS of MBS PDCCH that are currently monitored by the UE. In other words, if a UE autonomously switches to the new beam, then RSs that have same TCI-State of the beam may be added to the set of MBS BFD-RSs. On the other hand, RSs that have same TCI-State of an old failed beam may be excluded from the set of MBS BFD-RSs.

As another way to determine which CORESET a UE should use as the default/main COREST for MBS PDCCH reception, the UE may assume that default/main CORESET is the CORESET having an activated TCI-State that is QCLed with the explicitly indicated BFD-RS for MBS beam. That is, the CORESET having activated TCI-State that is QCLed with any of the explicitly indicated BFD-RSs for MBS beams may be assumed to be the default/main CORESET for the reception of MBS beams. The BFD-RS used to assess the MBS beam quality may be QCLed with the DMRS of MBS PDCCH. If the activated TCI-States of multiple CORESETs are QCLed with the same explicitly indicated BFD-RS for MBS beams, a UE may apply some rules to determine which CORESET to use as default/main CORESET. For example, a UE may assume that the CORESET having the lowest/highest ID as the default CORESET that the UE may use for the reception of MBS PDCCH.

The previously described processes to determine the default/main beam and the associated candidate beam list may be applied only once upon receiving the configurations or the activation MAC-CE with new TCI-State. For example, if beam a $b_0$ is determined as the default/main beam and candidate set is $\{b_1, b_2, b_3, b_4\}$ and when beam $b_0$ fails, beam $b_2$ is used for the recovery, then the default/main beam becomes $b_2$ and the candidate set becomes $\{b_0, b_1, b_3, b_4\}$. In other words, the size of the candidate beam set may always be fixed.

Alternatively, the size of candidate beam set may vary each time a beam failure is declared. For example, a failed beam may not be added to the candidate beam set. Moreover, a UE may apply the rules each time beam failure occurs. For example, for the ID method to derive the candidate beam set, then when a UE, for example, selects beam $b_2$ for recovery, the candidate beams set becomes $[b_3, b_4]$.

A UE may use a wrap-around technique to determine the set candidate beams on the on top of the ID method. For example, through higher-layer signalling, a gNB may indicate/configure all the available MBS beams set to be $\{b_0, b_1, b_2, b_3, b_4, b_5\}$, labelled as all-MBS-beams, which may be different from the constructed candidate beam set. If beam, for example, $b_0$ is determined to be the default/main beam and the size of the candidate beam set is determined to be three beams, then, the candidate beam set is $\{b_1, b_2, b_3\}$. When beam $b_0$ fails, beam $b_3$ may be used for the recovery, then the default/main beam becomes $b_3$ and the candidate set becomes $\{b_4, b_5, b_0\}$. The size of candidate beam set may be a predefined value, i.e., provided in specification, configured through higher-layer signalling, or derived by a UE according to certain rules, such as the number of candidate beam for unicast operation is equal to the number of candidate beams for MBS.

When a UE detects the failure of MBS beam that is actively monitored, the UE may autonomously switch to monitor any of the MBS beams associated with other candidate indicated CORESETs. To this end, a UE may consider the candidate RSs as the RS indexes with same values as the RS indexes in the RS set indicated by TCI-State for respective configured candidate CORESETs. This may help a UE determine which candidate CORESET and the associated MBS beam that the UE may use to recover the failed MBS beam. In one embodiment, a RS QCLed with candidate CORESETs may be a candidate RS to assess the quality of the candidate MBS beam.

Although this process may be transparent to a gNB, a gNB may configure a UE some thresholds on the determined candidate RSs through higher-layer signalling. The threshold may be, for example, RSRP, SINR, hypothetical BLER, etc. If the quality of measured metric of all candidate RS is worse than the provided threshold, a UE may switch from transparent to non-transparent recovery process, which will be described in more detail below.

Search Space Associated with a Single CORESET with Multiple TCI-States

Instead of associating the MBS search space with multiple CORESETs, one embodiment disclosed herein may be to keep the search space associated with a single CORESET as in NR Rel. 15/16, but the single CORESET is associated with multiple TCI-States. That is, the MBS search space may be linked to a single CORESET that may be associated with multiple MBS beam, and the main MBS beam may be the TCI-State indicated by the MAC-CE activation command. At any time, a UE monitors the CORESET with a single assumption of the TCI-state. More specifically, in NR Rel. 15/16, the RRC parameter tci-StatesPDCCH-ToAddList in ControlResourceSet IE provides a list of possible TCI-States of the single CORESET and then a MAC-CE indicate one of the TCI-States that is to be applied. Meanwhile, other configured TCI-States may be interpreted as other candidate beams that may be used upon the failure of a main MBS beam.

In the approach herein, although a UE may be monitoring a CORESET with particular TCI-State, other UEs in the same MBS group may be expected to be monitoring the same CORESET, but with different TCI-states assumptions. In other words, on the same time-frequency resources composing the CORESET, a gNB may use different beams to transmit MBS PDCCH to different MBS UEs. A similar concept may be extended to MBS PDSCH in which the PDSCH on the same time/frequency resources is transmitted on different beams to different MBS UEs.

As another possibility, a gNB may provide a UE with the other TCI-States of the candidate MBS beam through higher-layer signalling, such as a RRC parameter MBS-Candidate-TCI-States, as shown for example pseudo code ControlResourceSet IE below. Generally, the TCI-states provided MBS-Candidate-TCI-States may differ from the TCI-States provided in tci-StatesPDCCH-ToAddList. Some restrictions, however, may be applied by assuming that MBS-Candidate-TCI-States may always be a subset of tci-StatesPDCCH-ToAddList.

The maximum number of candidate beams, i.e., the number of candidate TCI-States: "maxNrofCandidateTCI-StatesPDCCH", may be predefined, i.e., provided in the specification, configured through higher-layer signalling, or a UE indicates to a gNB as part of the capability signalling of the UE.

A UE may be expected to monitor the CORESET with the activated TCI-State by MAC-CE or the default TCI-State (SSB identified during the initial access) as long as MBS beam failure is not declared. Once the beam failure has been declared, a UE may switch to any of the other candidate MBS beams. The following is example pseudo code for an example single CORESET with multiple TCI-States of candidate MBS beams that may be used upon a MBS beam failure being declared.

```
-- ASN1START
-- TAG-CONTROLRESOURCESET-START
ControlResourceSet ::=                          SEQUENCE {
   controlResourceSetId                            ControlResourceSetId,
   frequencyDomainResources                        BIT STRING (SIZE (45)),
   duration                                        INTEGER (1..maxCoReSetDuration),
                                                --[Irrelevant fields have been omitted]-
   tci-StatesPDCCH-ToAddList                       SEQUENCE(SIZE (1..maxNrofTCI-StatesPDCCH)) OF TCI-StateId
OPTIONAL, -- Cond NotSIB1-initialBWP
   MBS-Candidate-TCI-States-ToAddList              SEQUENCE(SIZE (1..maxNrofCandidateTCI-StatesPDCCH)) OF
TCI-StateId                                     OPTIONAL, -- Cond NotSIB1-initialBWP
   tci-StatesPDCCH-ToReleaseList                   SEQUENCE(SIZE (1..maxNrofTCI-StatesPDCCH)) OF TCI-StateId
OPTIONAL, -- Cond NotSIB1-initialBWP
   MBS-Candidate-TCI-States-ToReleaseList           SEQUENCE(SIZE (1..maxNrofCandidateTCI-StatesPDCCH))
OF TCI-StateId                                  OPTIONAL, -- Cond NotSIB1-initialBWP
                                                --[Irrelevant fields have been omitted]--
}
-- TAG-CONTROLRESOURCESET-STOP
-- ASN1STOP
```

Similar to the process described above, a UE may consider the candidate RSs as the RS indexes with same values as the RS indexes in the RS set indicated by the configured TCI-State for the configured candidate CORESETs. On the other hand, the TCI-State indicated by the activation MAC-CE may be counted as part of BFD-RS of MBS beam if MBS BFD-RSs are not configured or on the top to the configured MBS BFD-RSs.

A UE may determine that the set of MBS BFD-RSs include RS indexes with same values as the RS indexes in the RS sets indicated by TCI-State for default/main CORESETs that the UE uses for monitoring MBS PDCCH.

A UE may only assess the MBS beam quality using BFD-RSs that are QCLed with the DMRS of MBS PDCCH that are currently monitored by the UE. In other words, if a UE autonomously switches to a new beam, then RSs that have same TCI-State of this beam may be added to the set of MBS BFD-RSs. On the other hand, RSs that have same TCI-State of old failed beam may be excluded from the set of MBS BFD-RSs.

Although this process may be transparent to a gNB, the gNB may configure a UE some thresholds on the determined candidate RSs through higher-layer signalling, the threshold may be RSRP, SINR, hypothetical BLER, etc. If the quality of the measured metric of all candidate RS is worse than the provided threshold, a UE may switch from transparent to non-transparent recovery process, which will be described in more details below.

Although the previous examples of transparent recovery process are described for the case in which a MBS beam failure process may be used for a single MBS service/group, all the of proposed schemes disclosed herein may be easily extended to support the transparent recovery if independent beam failure recovery processes run for different MBS services/groups when configured. That is, a transparent recovery process may be applied for a case of having a different BFR process for different MBS services/groups. For example, different candidate TCI-states for different MBS services may be configured, as shown in the example pseudo code below.

```
-- ASN1START
-- TAG-CONTROLRESOURCESET-START
ControlResourceSet ::=                          SEQUENCE {
   controlResourceSetId                            ControlResourceSetId,
   frequencyDomainResource                         BIT STRING (SIZE (45)),
   duration                                        INTEGER (1..maxCoReSetDuration),
                                                --[Irrelevant fields have been omitted]-
   tci-StatesPDCCH-ToAddList                       SEQUENCE(SIZE (1..maxNrofTCI-StatesPDCCH)) OF TCI-StateId
OPTIONAL,                   -- Cond NotSIB1-initialBWP
   MBS-Candidate-TCI-States-ToAddList              SEQUENCE(SIZE (1.. maxMBS_group_services)) OF MBS-
CandidateTCI-State                              OPTIONAL, -- Cond NotSIB1-initialBWP
   tci-StatesPDCCH-ToReleaseList                   SEQUENCE(SIZE (1..maxNrofTCI-StatesPDCCH)) OF TCI-StateId
OPTIONAL,                   -- Cond NotSIB1-initialBWP
   MBS-Candidate-TCI-States-ToReleaseList          SEQUENCE(SIZE (1.. maxMBS_group_serives)) OF MBS-
CandidateTCI-State                              OPTIONAL, -- Cond NotSIB1-initialBWP
                                                --[Irrelevant fields have been omitted]--
}
MBS-CandidateTCI-State::=                       SEQUENCE {
   MBS-Candidate-TCI-States                        SEQUENCE(SIZE (1..maxNrofCandidateTCI-StatesPDCCH))
OF TCI-StateId                                  OPTIONAL, -- Cond NotSIB1-initialBWP
   MBS_group_service                               MBS_ID
OPTIONAL                                        -- Need R
}
-- TAG-CONTROLRESOURCESET-STOP
-- ASN1STOP
```

Non-Transparent Recovery Process

In a non-transparent recovery process, a UE may be expected to inform a gNB of the MBS beam failure. Specifically, in a non-transparent recovery process, a UE may indicate the MBS beam failure and identify a candidate beam or, alternatively, perform a recovery process. Different alternatives are disclosed herein that a UE may use to indicate the MBS failure and how a gNB may configure the MBS candidate beams for different MBS services/groups.

MAC-CE Based Approach

This approach may be similar to the beam-failure recovery request for a SCell. In addition to indicating the index of the cell in which MBS beam failure is detected, a UE may also indicate the MBS service/group in which the MBS failed. The cell index may be indicated by a bit map, similar to BFR for SCell and an additional field may carry the index of the MBS service/group. A particular code point of the field may be reserved to indicate the beam failure in all MBS services/groups such, for example, as all zeros or all ones.

Figure 7A:
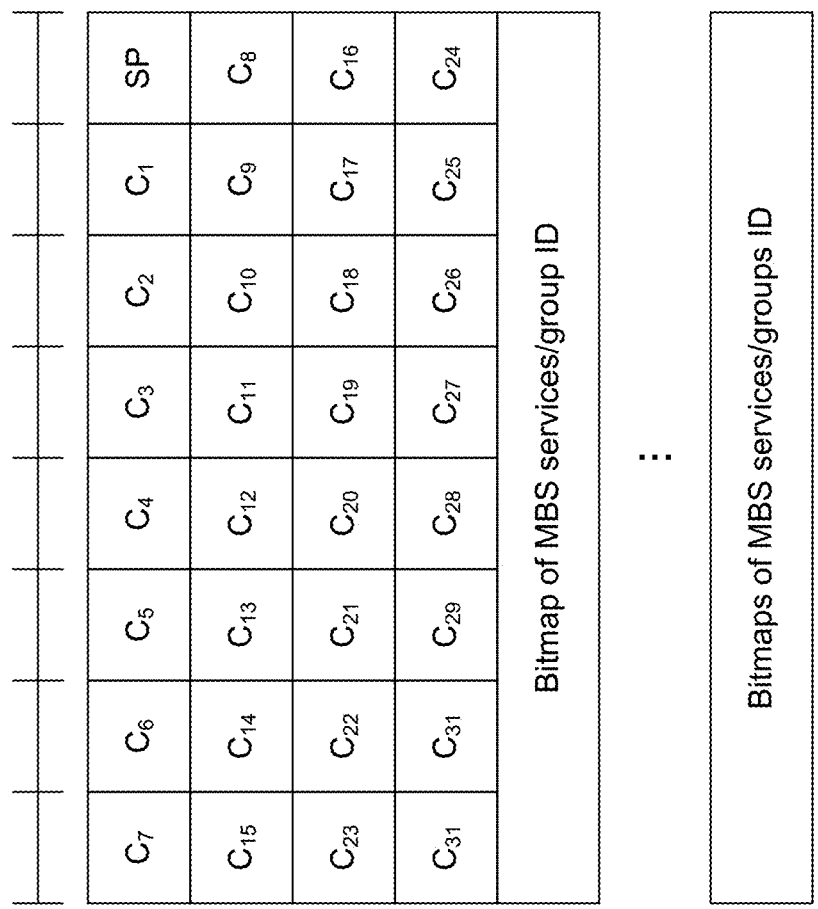
FIG. 7A depicts a MAC-CE indicating MBS beam failure for multiple serving cells with different MBS services/groups according to the subject matter disclosed herein.

Instead of providing the index of the MBS service/group for which a beam failed, a bitmap may be used to indicate the beam failure of multiple MBS services/groups, as shown in FIG. 7A. That is, FIG. 7A depicts a MAC-CE indicating MBS beam failure for multiple serving cells with different MBS services/groups according to the subject matter disclosed herein.

A field $C_i$ may be set to 1 if the MBS beam failure in a SCell with ServCellIndex i has been detected. If a MBS beam fails in a SpCell, the field SP may be set to one. For each indicated cell with a failed MBS, the corresponding bitmap of MBS services/groups ID fields may be included in the MAC-CE with ascending/descending the ID of the cell.

In addition to indicating the serving cell ID, and the MBS services/group IDs, additional fields may indicate the index of a preferred candidate beam having a quality that may be better than particular threshold indicated by higher-layer signaling, such as RSRP. If no candidate beam is above the indicated threshold, a UE may indicate the best measured candidate beam and the corresponding quality metric, such as RSRP.

Figure 7B:
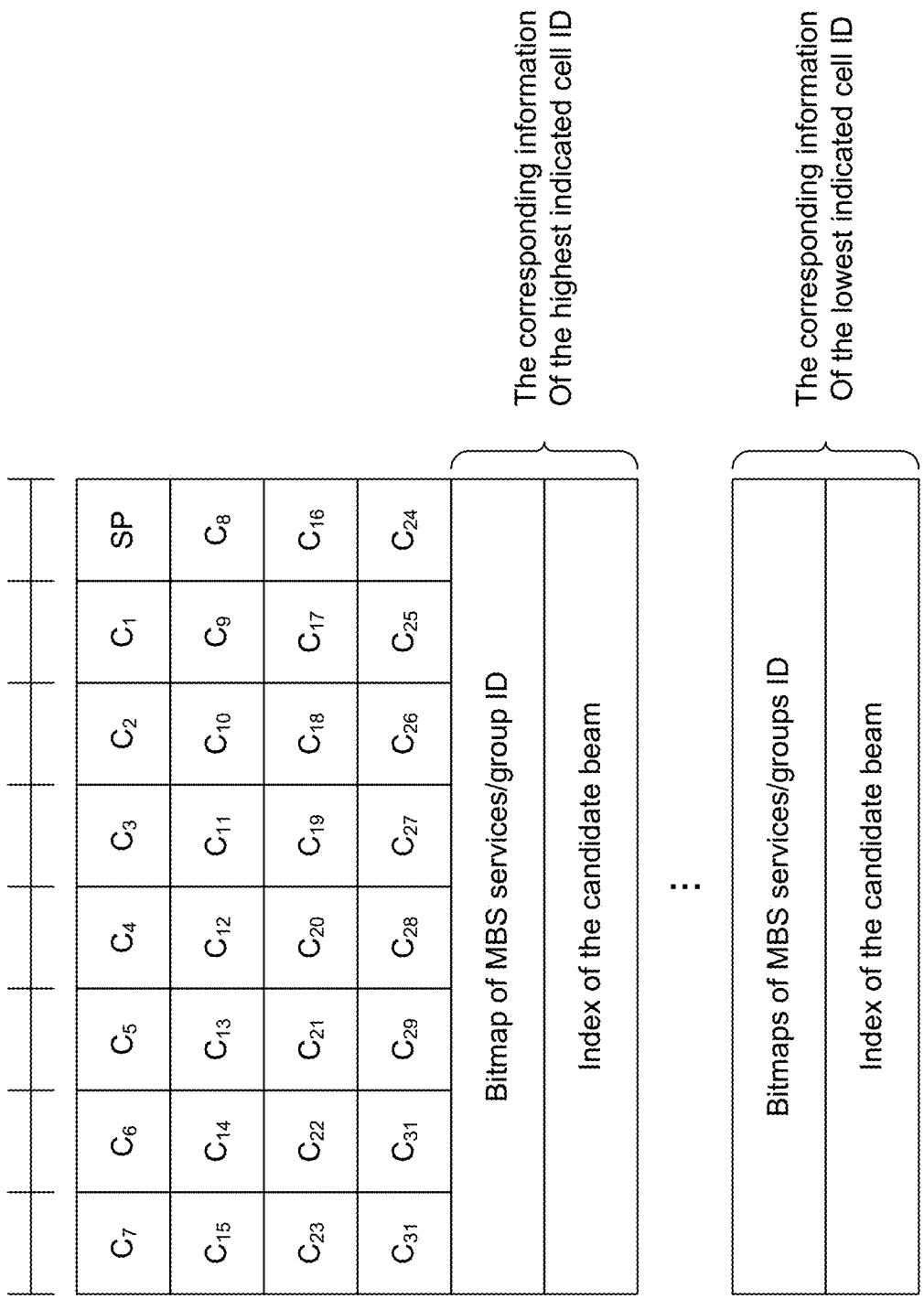
FIG. 7B depicts a MAC-CE indicating MBS beam failure for multiple serving cells with different MBS services/groups and pointing to the preferred candidate beam according to the subject matter disclosed herein.

FIG. 7B depicts a MAC-CE indicating MBS beam failure for multiple serving cells with different MBS services/groups and pointing to the preferred candidate beam according to the subject matter disclosed herein. The bitmap field of the MBS services/groups ID may be followed by an index of a preferred candidate beam. In one embodiment, a MAC-CE for SCell BFR may be the baseline for BFR for MBS in which the MAC-CE may additionally indicate the index of the MBS service/group, the index of a preferred candidate beam, and the associated measurement of the indicated beam. If there may be no available PUSCH to carry a MAC-CE, a UE may transmit a Schedule Request (SR) to obtain a grant to transmit the MAC-CE. A gNB may provide a UE with PUCCH configurations for this SR through higher-layer signaling, such as SR-MBS. If absent, a UE may use the same SR for BFR of a SCell. Moreover, because different MBS services/groups may have different requirements in terms of reliability, latency, etc., it may be beneficial to configure different SR to different MBS services/groups. For example, a gNB may use any of the aforementioned approaches to provide different SchedulingRequestId for different MBS services/groups. That is, a gNB may provide a UE with different SR configurations for different MBS services/groups to obtain uplink (UL) grant to transmit BFR MAC-CE.

A gNB may provide a UE with the MBS candidate beam in a similar way used to provide candidate beam list for a different SCells. A key difference here may be that different MBS service/group may have different candidate beams. Therefore, a gNB may provide a UE with such information through higher-layer signaling, as shown in the example pseudo code below.

```
-- ASN1START
-- TAG-MBS-candidateBeam-START
MBS-candidateBeam::= SEQUENCE {
    rsrp-ThresholdBFR              RSRP-Range
OPTIONAL, -- Need M
    MBScandidateBeamRSList         SEQUENCE (SIZE(1..MBSmaxNrofCandidateBeams)) OF
MBSCandidateBeamRS                 OPTIONAL, -- Need M
    ...
}
MBSCandidateBeamRS::=              SEQUENCE {
    MBScandidateBeamConfig             CHOICE {
        ssb                                SSB-Index,
        csi-RS                             NZP-CSI-RS-ResourceId
    },
    servingCellId                      ServCellIndex      OPTIONAL -- Need R
    MBS_group_service              MBS_ID                 OPTIONAL, -- Need M
}
-- TAG- MBS-candidateBeam -STOP
-- ASN1STOP
```

Although in the previous exemplary IE, single values have been used for all MBS candidate beams thresholds, different values may be provided as well for different MBS services/groups through higher-layer signalling. In one embodiment, MBS candidate beams may be different from one MBS service to another and the candidate beams may be provided through higher-layer signalling.

UCI Based Approach:

In this approach, a UE may use UCI to indicate a MBS failure. The UCI may be transmitted on multiplexed on configured grant PUSCH or dynamic grant PUSCH (piggybacked UCI on CG/DG PUSCH). For example, an additional 1-bit field may indicate the beam failure of all MBS service. Additional details may be provided in the UCI that are similar to the details provided in a MAC-CE, such as the ID of MBS service/group, the preferred candidate beam, the associated measurement with best candidate beam, etc.

To reduce the detection overhead on the gNB side and avoid a blind detection of the existence of UCI that indicates the failure of MBS beam, a gNB may provide an indication on when a UE may transmit a UCI to indicate a MBS beam failure. For example, a gNB may provide a UE with such indication through higher-layer signaling, such as a RRC parameter BFRQ-OnUCI that is set to true, through a MAC-CE, or in a PDCCH scrambled with C-RNTI/configured scheduling-radio network temporary identifier (CS-RNTI). In this case, if the MBS beam failure occurs, the UE may transmit a UCI indicating such failure. In one embodiment, a UCI may carry a MBS beam failure recovery request and a gNB may control whether a UE may transmit or not through higher-layer signaling at least.

RACH Based Approach

Similar to BFR in a SpCell in which candidate beams are associated with different RACH preamble IDs and/or different RA occasions, a similar process may be applied for a MBS BFR at least for a SpCell. One example embodiment may be that a gNB may provide a UE with candidate MBS beam RS IDs and their associated preamble ID and/or RA occasion that may be used to transmit the MBS beam failure recovery request. Moreover, such association may depend on the MBS service/group ID. In other words, different MBS service/group may have different recovery resources that any help a gNB to distinguish between the MBS beam failure of different MBS services/groups. This may be realized through higher-layer signaling, as shown in the example pseudo code below.

```
-- ASN1START
-- TAG-BEAMFAILURERECOVERYCONFIG-START
BeamFailureRecoveryConfig ::= SEQUENCE {
    rootSequenceIndex-BFR                       INTEGER (0..137)
OPTIONAL,                       -- Need M
    rach-ConfigBFR                              RACH-ConfigGeneric
OPTIONAL,                       -- Need M
    rsrp-ThresholdSSB                           RSRP-Range
OPTIONAL,                       -- Need M
    candidateBeamRSList                         SEQUENCE (SIZE(1..maxNrofCandidateBeams)) OF PRACH-
ResourceDedicatedBFR                    OPTIONAL, -- Need M
    MBScandidateBeamRSList                          SEQUENCE (SIZE(1..MBSmaxNrofCandidateBeams)) OF MBS-
Candidate                               OPTIONAL, -- Need M
    ssb-perRACH-Occasion                        ENUMERATED {oneEighth, oneFourth, oneHalf, one, two,
                                                    four, eight, sixteen}
OPTIONAL,                       -- Need M
    ra-ssb-OccasionMaskIndex                    INTEGER (0..15)
OPTIONAL,                       -- Need M
    recoverySearchSpaceId                       SearchSpaceId
OPTIONAL,                       -- Need R
    ra-Prioritization                           RA-Prioritization
OPTIONAL,                       -- Need R
    beamFailureRecoveryTimer                    ENUMERATED {ms10, ms20, ms60, ms80, ms100, ms150,
ms200}                                  OPTIONAL, -- Need M
    ...,
    [[
    msg1-SubcarrierSpacing                      SubcarrierSpacing
OPTIONAL                        -- Need M
    ]],
    [[
    ra-PrioritizationTwoStep-r16                RA-Prioritization
OPTIONAL,                       -- Need R
    candidateBeamRSListExt-v1610                SetupRelease{ CandidateBeamRSListExt-r16 }
OPTIONAL                        -- Need M
    ]]
}
PRACH-ResourceDedicatedBFR ::=           CHOICE {
    ssb                                         BFR-SSB-Resource,
    csi-RS                                      BFR-CSIRS-Resource
}
BFR-SSB-Resource ::=                     SEQUENCE {
    ssb                                         SSB-Index,
    ra-PreambleIndex                            INTEGER (0..63),
    ...
}
BFR-CSIRS-Resource ::=                   SEQUENCE {
    csi-RS                                      NZP-CSI-RS-ResourceId,
    ra-OccasionList                             SEQUENCE (SIZE(1..maxRA-OccasionsPerCSIRS)) OF INTEGER
(0..maxRA-Occasions-1)                  OPTIONAL, -- Need R
    ra-PreambleIndex                            INTEGER (0..63)
OPTIONAL,                       -- Need R
    ...
}
CandidateBeamRSListExt-r16::=            SEQUENCE (SIZE(1.. maxNrofCandidateBeamsExt-r16)) OF PRACH-
ResourceDedicatedBFR
MBS-Candidate::=                         SEQUENCE {
    candidateBeamRSList                         SEQUENCE (SIZE(1..maxNfrofCandidateBeams)) OF PRACH-
ResourceDedicatedBFR                    OPTIONAL, -- Need M
    MBS_group_service        MBS_ID         OPTIONAL -- Need R
}
-- TAG-BEAMFAILURERECOVERYCONFIG-STOP
-- ASN1STOP
```

Although in the previous exemplary other configurations associated with the MBS BFR are assumed to be the same as the configurations the unicast, they may in general be different. For example, a different MBS recovery search space may be configured through higher-layer signaling. Also, it may vary from one MBS service/group to another. Similarly, the MBS beam failure recovery timer may be different than the unicast beam failure recovery and it may be provided through higher-layer signaling. Moreover, the MBS beam failure recovery timer may vary from one MBS service/group to another.

In one embodiment, PRACH may be used to carry the MBS beam failure recovery request of MBS services. The MBS BFRQ may be separated from a unicast BFRQ in the code domain (preamble ID) and/or time and frequency domains (RA occasion). In another embodiment, different MBS services/groups may have different candidate beams that may be associated with different RACH resources.

Recovery Process

A recovery process may be similar to the ones used for a unicast BFR in a SpCell and a SCell. For example, if a UE uses a PRACH-based approach on a SpCell, the UE may start monitoring the response in the recovery search space after some time from transmitting BFRQ. The MBS recovery SS may be the one used in case of a unicast beam failure and it may be a different one that may be configured through higher-layer signaling, such as the RRC parameter MBS-recoverySearchSpaceId. A UE monitors PDCCH in this MBS recovery SS assuming that the same antenna port QCL parameters as the ones associated with a preferred beam indicated in the BFRQ message until the reception through higher-layers an activation for a TCI state, i.e., TCI activation MAC-CE, for SS/CORESET associated with MBS or any RRC reconfigurations of the parameters to change the configured TCI parameters of the CORESETs associated with a MBS SS or any other SS that may be used to transmit MBS DCI. After a UE receives/detects PDCCH scheduling MBS, such as a DCI scrambled with G-RNTI for a PTM scheme 1 or C-RNTI for a PTM scheme 2 or point to point (PTP), or any other unicast PDCCH, on the indicated candidate beam in BFRQ message, the UE continues to monitor PDCCH candidates in the search space set provided by MBS-recoverySearchSpaceId until the UE receives a MAC CE activation command that activates a TCI state of any CORESET that may be used for MBS PDCCH or any RRC reconfigurations of the parameters to change the configured TCI parameters of the CORESETs associated with a MBS SS or any other SS that may be used to transmit MBS DCI. A UE may assume that the recovery may be completed successfully and the UE may use the new beam to receive MBS activities.

For a SCell or a SpCell, a UE may transmit a BFR MAC-CE and if the UE receives any PDCCH that provides a UL grant with the same HARQ process ID of the one used for a MAC-CE transmission and NDI is toggled, then the UE may monitor MBS on the new identified beam in the BFR MAC-CE after some duration. The durations between different operations of MBS recovery process may be (un)equal to the durations indicated to the unicast BFR process and it may be provided through higher-layer signaling.

Instead of monitoring PDCCH with QCL parameters as the ones associated with the preferred beam indicated in the BFRQ message in the configured recovery SS, e.g., in case of MBS beam failure SpCell, a UE may monitor the response from the gNB in any other UE-specific PDCCH. For example, a UE may assume that this PDCCH is QCLed with the indicated reference signal in the BFRQ message, but this may not exclude the usage of other beams as well. The fields of the recovery response PDCCH may have particular values to indicate the successful reception of a BFRQ message at the gNB side and to differentiate this PDCCH from regular scheduling PDCCH.

For example, a combination of the values of following fields may serve this purpose: MCS, HARQ ID, RV, etc. Also, another UE-specific RNTI may be used to scramble the recovery response PDCCH. This RNTI may be configured through higher-layer signaling, or derived according to certain rules as a function of C-RNTI, CS-RNTI, G-RNTI, for example. This RNTI should only be used after the transmission of BFRQ message. Also, new fields may be introduced in a recovery response PDCCH, such as a 1-bit field to indicate whether the received PDCCH may be a regular PDCCH or a recovery response PDCCH. Moreover, another field may indicate the ID of MBS service/group that may be used to differentiate the beam failure response in case of the beam failure of multiple MBS services/groups at the same time. The recovery response PDCCH may provide grant for DL/UL or just provide the indication of beam recovery response without any associated grant.

A UE may assume that a recovery response PDCCH may be transmitted according to the configurations of the SS used for the reception of a MBS PDCCH. If there are multiple SS configured/used to receive MBS PDCCH, a UE may determine which SS may be used for the reception of a recovery response PDCCH according to certain rules. For example, among those SSs, the SS with the lowest/highest ID may be used to receive the recovery response PDCCH. Alternatively, among those SSs, the SS used to receive the last MBS PDCCH before the transmission of BFRQ message may be used to receive the recovery response PDCCH. Although the UE may use the already configured MBS SS with their associated CORESET, the UE may assume that the identified recovery beam in BFRQ message may be used for the transmission of the recovery response PDCCH. Also, the recovery response PDCCH may be monitored in other unicast SS or CSS.

According to the non-transparent recovery, the explicitly configured MBS candidate beams for a particular UE may be expected to be the functional MBS beam for other UEs in the same MBS group. Therefore, when the UE identifies a particular candidate beam to recover the failed MBS beam, the UE may resume the reception of MBS activities.

Moreover, the aforementioned process to configure/indicate the sets of BFD-RSs and candidate beam RSs of transparent recovery process may be applied in non-recovery process. For example, if a UE may be configured with a search space with multiple CORESETs or a single CORESET with multiple TCI-States, the UE may be expected to identify the candidate beam RSs and BFD-RS according to the processes described in transparent recovery process. Upon declaring beam failure, the UE may indicate to the gNB the preferred candidate beam according to non-transparent recovery process. For example, the UE may use a MAC-CE or a UCI to indicate the index of the candidate beam.

As another example embodiment, a UE may switch between different PTM scheduling schemes. For example, it may be assumed that the configured MBS BFD-RSs are associated PDCCH of PTM scheme 1 in which DCI is scrambled with G-RNTI and it is addressed to multiple MBS UEs at the same time. When a MBS beam failure is detected, a UE may stop monitoring PDCCH of a PTM scheme 1 and switch to another PTM scheduling scheme, such as a PTM scheme 2 in which the PDCCH may be scrambled with other UE-specific RNTI and through unicast beam.

Figure 8:
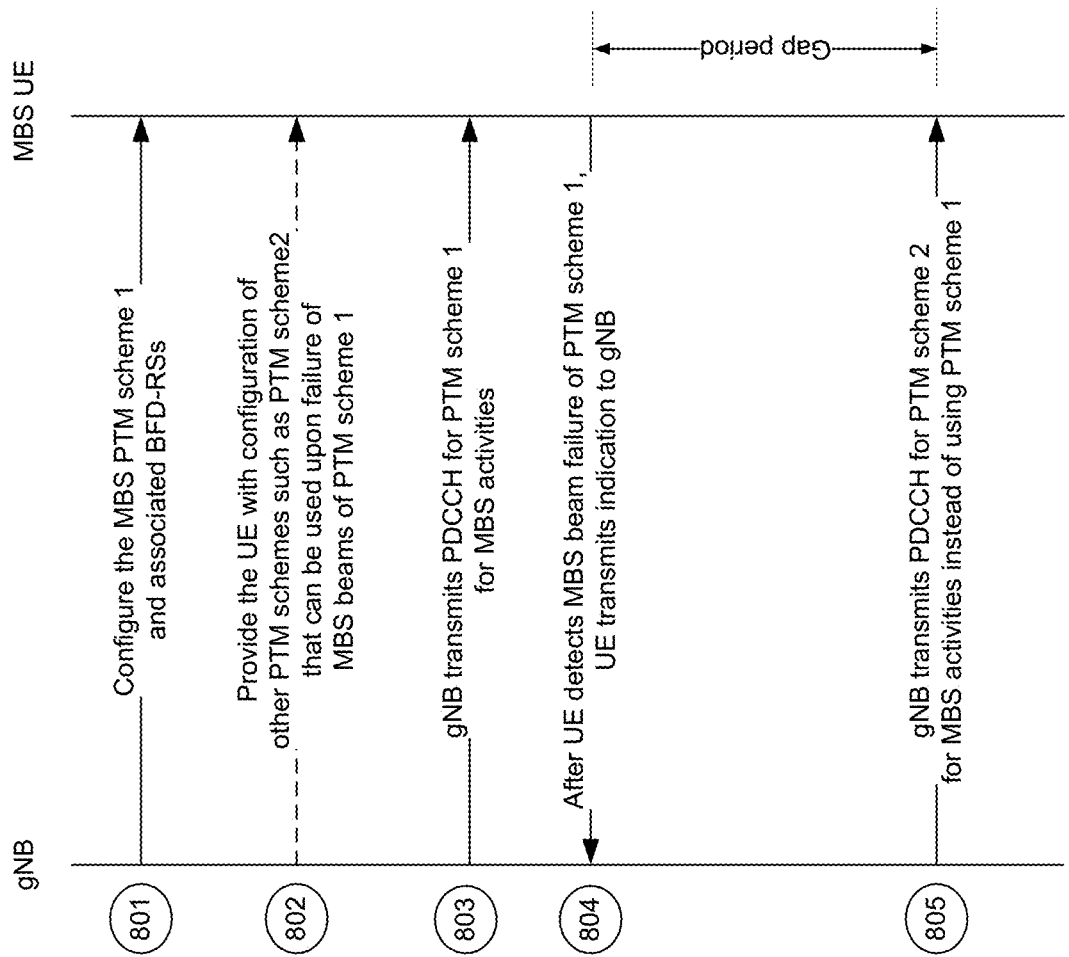
FIG. 8 depicts an example signal direction chart of a UE switching to a second PTM scheduling scheme to recover from a beam failure detected in a first PTM scheduling scheme according to the subject matter disclosed herein.

FIG. 8 depicts an example signal direction chart 800 of a UE switching to a second PTM scheduling scheme to recover from a beam failure detected in a first PTM scheduling scheme according to the subject matter disclosed herein. In one embodiment, upon the failure of MBS beam used for a PTM scheme 1, a UE may switch to monitor a PTM scheme 2/PTP on unicast beam. In one embodiment, a gNB may configure a UE with a SS to monitor, for example, a PTM scheme 2 upon the failure of a PTM scheme 1 MBS beam. In another embodiment, the TCI-State of the CORESET associated with the recovery SS may be determined based on the indicated candidate beam in a BFRQ message.

As used herein, a PTM scheme 1 includes a group common PDCCH and a group common PDSCH. As used herein, a PTM scheme 2 includes a UE-specific PDCCH and a group common PDSCH. Also as used herein, a PTP scheme includes a UE-specific PDCCH and a UE-specific PDSCH.

At 801 in FIG. 8, a gNB explicitly/implicitly provides a MBS UE with BFD-RSs associated with PDCCH of a PTM scheme 1 using any of the aforementioned schemes. Moreover, the gNB may optionally provide a UE with the configurations for a PTM scheme 2 that the UE may use upon detecting a MBS failure of a PTM scheme 1, as shown at 802 with a dashed line. At 803, the gNB uses a PTM scheme 1 to schedule MBS activities. At 804, upon detecting a MBS beam failure, a UE transmits an indication of the beam failure to the gNB using any of the aforementioned schemes or by a combination of any of the forementioned different schemes. At 805, after some gap period, the UE may start monitoring the MBS activities using a PTM scheme 2 on a good unicast beam that may be different than the failed MBS beam.

The gap period between 804 and 805 may be predefined, i.e., provided in the specification, configured through higher layer signaling, or indicated by the UE as part of the capability signaling of the UE. The gap duration may also be the same as the duration from the PRACH for BFRQ in a SpCell and the beginning of monitoring the response of the gNB, for example.

At 802, the gNB may provide the MBS UE with the search space ID that may be used upon the failure of MBS beam through higher-layer signaling, such as UE-specific-MBSRecovery-SS. The CORESET associated with the SS may not have TCI-State. Instead, the TCI-State of the CORESET may be determined based on the identified candidate beam in the BFRQ message to the gNB. In other words, upon declaring a MBS beam failure for a PTM scheme 1, a UE commences monitoring PDCCH of a PTM scheme 2 according to the SS indicated in UE-specific-MBSRecovery-SS and uses the indicated candidate beam for the reception. The UE may assume the same antenna port quasi-collocation parameters as were associated with the indicated candidate beam in the BFRQ message. It is worth mentioning that this recovery PDCCH of a PTM scheme 2 is only monitored after declaring the beam failure of a MBS beam for a PTM scheme 1.

If no candidate beam is indicated/identified, a UE may assume that the PDCCH of PTM scheme 2 in the recovery SS is QCLed with the same RS that provided the QCL information of the last received UE-specific PDCCH. In other words, a UE may assume that the same beam used for the transmission of the last UE-specific PDCCH may be used for PDCCH of PTM scheme 2 upon declaring the failure of a MBS beam of a PTM scheme 1. That is, a UE may assume the same beam that was used to receive the last UE-specific PDCCH may be used to receive PDCCH of PTM scheme 2 in case of the failure of MBS beam and no candidate beam is indicated/identified.

Figure 9:
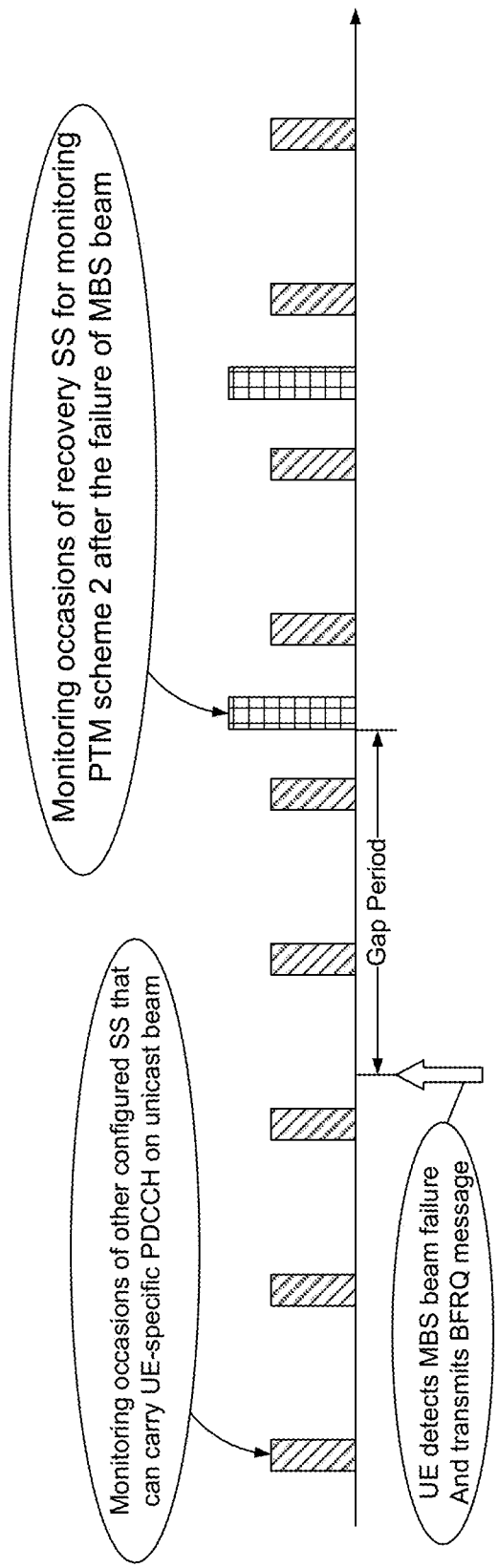
FIG. 9 depicts a recovery of a PTM scheme 2 PDCCH that has been transmitted in an earlier monitoring occasion of another Search Space different from a configured recovery Search Space according to the subject matter disclosed herein.

FIG. 9 depicts a recovery PDCCH according to PTM scheme 2 may be transmitted in an earlier monitoring occasion of another SS different from a configured recovery SS according to the subject matter disclosed herein. In some situations, it may occur that the monitoring occasions of other SSs that may carry a UE-specific PDCCH with a unicast beam may fall within the gap period, as shown in FIG. 9, for example. In this case, a UE may monitor the PDCCH of a PTM scheme 2 in the earliest monitoring occasion as response of a MBS BFRQ message, rather than waiting to the first monitoring occasion of the configured recovery search space. A UE may assume that a gNB applies the same beam for the transmission of other PDCCH in this monitoring occasion on PDCCH of a PTM scheme 2 instead of the indicated candidate beam, if any.

In one embodiment, upon the transmission of MBS BFRQ and if the monitoring occasions of other configured search space occur in the gap period before monitoring a recovery SS, a UE may attempt to decode PTM scheme 2 in the earlier monitoring occasions. After the gap period, a UE may only monitor the PTM scheme 2 as a recovery of a MBS beam failure in the configured recovery SS.

As another embodiment, and also if no recovery search UE-specific-MBSRecovery-SS is provided, a UE may monitor PDCCH for a PTM scheme 2 in an SS that may carry UE-specific PDCCH with unicast beam. A UE may start monitoring PDCCH for PTM scheme 2 after some duration from transmitting the BFRQ message. A UE may assume that a gNB applies the same beam for the transmission of other PDCCH in this SS on PDCCH of PTM scheme 2 instead of the indicated candidate beam, if any.

After the reception of PDCCH for a PTM scheme 2 in a particular SS, the UE keeps using the SS to receive PDCCH for a PTM scheme 2 until receiving further instruction from a gNB. A UE may resume monitoring PDCCH of a PTM scheme 1 using an old beam and any other beam upon the reception of a RRC reconfiguration.

Alternatively, a UE may resume monitoring PDCCH of a PTM scheme 1 if it receives MAC-CE indicating a new TCI-State to the CORESET used to monitor PTM scheme 1. A UE may resume monitoring PDCCH of a PTM scheme after some duration from the reception of a MAC-CE with the new TCI-State. The duration may be predefined, i.e., provided in the specification, for example. The duration may start from the last symbol of PDSCH carrying the MAC-CE with the new TCI-State until the first monitoring occasion of PDCCH for a PTM scheme 1. The duration may be in units of OFDM symbols, slots, msec, etc.

As another embodiment, the PDCCH of a PTM scheme 2 or any other unicast PDCCH or GC-PDCCH may indicate whether the UE may resume monitoring PDCCH of a PTM scheme 1. For example, based on some measurements, a gNB may be able to determine that the previously failed beam of a PTM scheme 1 is restored again. In this case, a gNB may use such PDCCHs to indicate the resumption of monitoring of PDCCH of a PTM scheme 1. A UE may resume monitoring PDCCH of PTM scheme after some duration from the reception of indication in another PDCCH. This duration may be predefined, i.e., provided in the specification, for example. It may start from the last symbol of PDCCH carrying the indication until the first monitoring occasion of PDCCH for a PTM scheme 1. It may be in units of OFDM symbols, slots, msec, etc.

If a UE does not receive a PTM scheme 2 for certain period, the UE may attempt to transmit the BFRQ again. This period may be configured through higher-layer signaling or, if not provided, equal to beamFailureRecoveryTimer of the unicast beam failure recovery.

Figure 10:
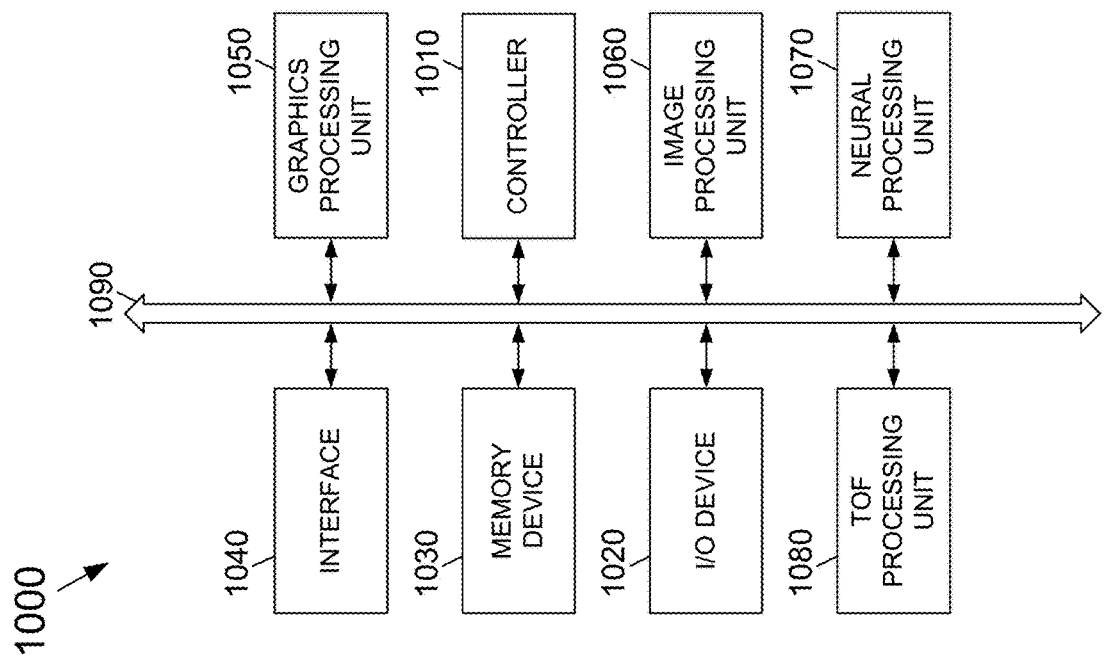
FIG. 10 depicts an electronic device that include a capability to recover from a MBS beam failure incident according to the subject matter disclosed herein

FIG. 10 depicts an electronic device 1000 that include a capability to recover from a MBS beam failure incident according to the subject matter disclosed herein. In one example embodiment, the electronic device 1000 may be configured as a UE. In another example embodiment, the electronic device 1000 may be configured as a gNB. Electronic device 1000 and the various system components of electronic device 1000 may be formed from one or modules that individually or collectively perform the functionality disclosed herein to configure a device to recover from an MBS beam failure incident and/or to recover from a MBS beam failure incident according to the subject matter disclosed herein.

The electronic device 1000 may include a controller (or CPU) 1010, an input/output device 1020 such as, but not limited to, a keypad, a keyboard, a display, a touch-screen display, a 2D image sensor, a 3D image sensor, a memory 1030, an interface 1040, a GPU 1050, an imaging-processing unit 1060, a neural processing unit 1070, a TOF processing unit 1080 that are coupled to each other through a bus 1090. The controller 410 may include, for example, at least one microprocessor, at least one digital signal processor, at least one microcontroller, or the like. The memory 1030 may be configured to store a command code to be used by the controller 1010 and/or to store a user data. In one embodiment, the controller 1010 may configure and control the neural processing unit 1070.

The interface 1040 may be configured to include a wireless interface that is configured to transmit data to or receive data from, for example, a wireless communication network using a RF signal. The wireless interface 1040 may include, for example, an antenna. The electronic system 1000 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to manage beams in a wireless communication network, the method comprising:
   receiving, at a first device from a second device, a Physical Downlink Control Channel (PDCCH) and a Physical Downlink Shared Channel (PDSCH) for communications in a Common Frequency Resource (CFR);
   receiving, at the first device, a configuration for at least one Beam Failure Detection Reference Signal (BFD RS) associated with a first beam and an identification of one or more second beams for reception of the PDCCH upon failure of the first beam;
   detecting, at the first device, a Beam Failure Incident (BFI) of the first beam using information about the at least one BFD RS configuration to provide a detected BFI; and
   autonomously switching, at the first device, from using the first beam to using one of the one or more second beams in response to detecting the BFI of the first beam;
   wherein the first beam and the one or more second beams are included in a Multicast and Broadcast Services (MBS) virtual beam.

2. The method of claim 1, wherein the first device comprises a User Equipment (UE), and the second device comprises a Next Generation NodeB (gNB).

3. The method of claim 1, wherein the configuration for the at least one BFD RS provides explicit information about the at least one BFD RS configuration by using higher-layer signaling.

4. The method of claim 1, wherein the configuration for the at least one BFD RS provides implicit information to the first device about the at least one BFD RS configuration based on a control resource set (CORESET) confinement within the CFR for the or a CORESET association with at least one search space set used for monitoring.

5. The method of claim 1, wherein detecting the beam failure incident of the first beam comprises using a BFI counter that is separate from a unicast BFI counter.

6. The method of claim 1, further comprising autonomously connecting to a second beam by the first device based on detecting the BFI.

7. The method of claim 6, further comprising selecting, by the first device, the second beam based on at least one control resource set (CORESET) associated with the second beam, the at least one CORESET being associated with at least one beam.

8. The method of claim 1, further comprising communicating by the first device to the second device a Beam Failure Recovery Request (BFRQ) based on detecting the BFI.

9. The method of claim 8, wherein communicating by the first device to the second device the BFRQ uses a Medium Access Control-Control Element (MAC CE), an Uplink Control Information (UCI) or a Random Access Channel (RACH).

10. The method of claim 8, wherein communicating by the first device to the second device further comprises communicating information relating to at least one of a cell identification of the BFI, an identification of the associated with a failed beam, or a candidate recovery beam.

11. A wireless communication system, the system comprising:
   a Next Generation NodeB (gNB) configured to send at least one Beam Failure Detection Reference (BFD RS) configuration to the system; and
   a User Equipment (UE) configured to receive a Physical Downlink Control Channel (PDCCH) and a Physical Downlink Shared Channel (PDSCH) for communications in a Common Frequency Resource (CFR) and the at least one BFD RS associated with a first beam and an identification of one or more second beams for reception of the PDCCH upon failure of the first beam, and configured to detect a Beam Failure Incident (BFI) of the first beam using information about the at least one BFD RS configuration to provide a detected BFI, and further configured to recover autonomously switch from using the first beam to using one of the one or more second beams in response to detecting the BFI of the first beam;
   wherein the first beam and the one or more second beams are included in a Multicast and Broadcast Services (MBS) virtual beam.

12. The system of claim 11, wherein the configuration for the at least one BFD RS is received by the UE and provides explicit information about the at least one BFD RS configuration by higher-layer signaling.

13. The system of claim 11, wherein the configuration for the at least one BFD RS includes a maximum number of BFD RSs.

14. The system of claim 11, wherein the configuration for the at least one BFD RS provides implicit information to the gNB about the at least one BFD RS configuration based on a control resource set (CORESET) confinement within a common frequency resource (CFR) for the system or a CORESET association with at least one search space set used for monitoring.

15. The system of claim 11, wherein the UE is configured to detect the beam failure incident of the first beam using a BFI counter that is separate from a unicast BFI counter.

16. The system of claim 11, wherein the UE autonomously connects to a second beam based on detecting the BFI.

17. The system of claim 16, wherein the UE selects the second beam based on at least one control resource set (CORESET) associated with the second beam, the at least one CORESET being associated with multiple beams or a single beam.

18. The system of claim 11, wherein the UE communicates to the gNB a Beam Failure Recovery Request (BFRQ) based on detecting the BFI.

19. The system of claim 18, wherein the UE communicates to the gNB the BFRQ using a Medium Access Control-Control Element (MAC CE), an Uplink Control Information (UCI) or a Random Access Channel (RACH).

20. The system of claim 18, wherein the UE is configured to communicate to the gNB information relating to at least one of a cell identification of the BFI, an identification of the associated with a failed beam, or a candidate recovery beam.

* * * * *